United States Patent
Janis et al.

(10) Patent No.: US 9,186,582 B2
(45) Date of Patent: *Nov. 17, 2015

(54) ONLINE GAME WITH ANIMAL-BREEDING MECHANIC FOR COMBINING VISUAL DISPLAY PARAMETERS

(75) Inventors: Sean Janis, Lafayette, CA (US); Greg Omi, Brisbane, CA (US); Tim Wang, Berkeley, CA (US); Vasudev Vadlamudi, San Francisco, CA (US); Bruce Harlick, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,922

(22) Filed: Sep. 26, 2011

(65) Prior Publication Data

US 2012/0238361 A1 Sep. 20, 2012

Related U.S. Application Data

(63) Continuation of application No. 13/174,713, filed on Jun. 30, 2011.

(60) Provisional application No. 61/453,303, filed on Mar. 16, 2011.

(51) Int. Cl.
*A63F 13/00* (2014.01)
*A63F 13/10* (2006.01)
(Continued)

(52) U.S. Cl.
CPC ........... *A63F 13/12* (2013.01); *A63F 2300/407* (2013.01); *A63F 2300/5533* (2013.01); *A63F 2300/6009* (2013.01); *A63F 2300/8058* (2013.01)

(58) Field of Classification Search
CPC ............... A63F 13/12; A63F 2300/65; A63F 2300/407; A63F 2300/5533; A63F 2300/8058; A63F 2300/6009
USPC ...................... 463/31, 1, 30, 40–42
See application file for complete search history.

(56) References Cited

U.S. PATENT DOCUMENTS 5,375,195 A * 12/1994 Johnston ................. 345/630
5,572,646 A * 11/1996 Kawai et al. .............. 345/501
(Continued)

OTHER PUBLICATIONS

Edwards, Benj. "The Ten Greatest PC Games Ever." PCWorld magazine (online).Feb. 8, 2009. pp. 1 and 2. Accessed Jun. 20, 2012. <http://www.pcworld.com/article/158850/the_ten_greatest_pc_games_ever.html?tk=nl_bex_h_reviews>.*
(Continued)

*Primary Examiner* — William H McCulloch, Jr.
(74) *Attorney, Agent, or Firm* — Schwegman Lundberg & Woessner, P.A.

(57) ABSTRACT

An animal-breeding mechanic enables the generation of an offspring virtual animal in an online game system by combining features of a male virtual animal and a female virtual animal. Multiple candidates for the offspring virtual animal may be generated, and a selection or identification can then be made from the multiple candidates. Relevant features may include a base color and optional pattern markings with a corresponding pattern color. Additional game aspects may include options for enhancing the likelihood of generating a successful offspring, decreasing the time for generating the offspring, and nurturing the offspring to maturity. Parameterized color values for a specific virtual animal may be substituted into source artwork to generate a variety of distinctive displays.

26 Claims, 20 Drawing Sheets

(51) Int. Cl.
  *G06F 17/00* (2006.01)
  *G06F 17/16* (2006.01)
  *A63F 13/30* (2014.01)

(56) References Cited

U.S. PATENT DOCUMENTS

| | | | |
|---|---|---|---|
| 6,171,189 B1* | 1/2001 | Katano et al. | 463/43 |
| 6,213,871 B1* | 4/2001 | Yokoi | 463/7 |
| 6,229,904 B1* | 5/2001 | Huang et al. | 382/100 |
| 6,251,010 B1* | 6/2001 | Tajiri et al. | 463/1 |
| 6,251,012 B1* | 6/2001 | Horigami et al. | 463/7 |
| 6,253,167 B1* | 6/2001 | Matsuda et al. | 703/11 |
| 6,254,477 B1* | 7/2001 | Sasaki et al. | 463/1 |
| 6,267,677 B1* | 7/2001 | Tajiri et al. | 463/43 |
| 6,449,518 B1* | 9/2002 | Yokoo et al. | 700/86 |
| 6,482,067 B1* | 11/2002 | Pickens | 446/268 |
| 6,577,328 B2* | 6/2003 | Matsuda et al. | 715/757 |
| 6,814,662 B2* | 11/2004 | Sasaki et al. | 463/1 |
| 6,832,955 B2* | 12/2004 | Yokoi | 463/7 |
| 7,025,675 B2* | 4/2006 | Fogel et al. | 463/9 |
| 7,046,242 B2* | 5/2006 | Kitsutaka | 345/419 |
| 7,104,884 B2* | 9/2006 | Yokoi | 463/7 |
| 7,117,190 B2* | 10/2006 | Sabe et al. | 706/45 |
| 7,179,171 B2* | 2/2007 | Forlines et al. | 463/41 |
| 7,370,974 B2* | 5/2008 | Yamada et al. | 353/28 |
| 7,599,802 B2* | 10/2009 | Harwood et al. | 702/20 |
| 7,677,974 B2* | 3/2010 | Van Luchene | 463/29 |
| 7,690,997 B2* | 4/2010 | Van Luchene et al. | 463/42 |
| 7,789,758 B2* | 9/2010 | Wright | 463/42 |
| 7,803,046 B2* | 9/2010 | Scott et al. | 463/28 |
| 7,806,758 B2 | 10/2010 | Van Luchene | |
| 7,819,731 B2* | 10/2010 | Suzuki | 463/1 |
| 7,867,093 B2* | 1/2011 | Wright | 463/42 |
| 7,970,663 B2* | 6/2011 | Ganz et al. | 705/26.61 |
| 7,974,901 B2* | 7/2011 | Van Luchene | 705/35 |
| 7,974,902 B2* | 7/2011 | Van Luchene | 705/35 |
| 8,241,099 B2* | 8/2012 | Blair et al. | 463/9 |
| 8,251,810 B2* | 8/2012 | Van Luchene | 463/29 |
| 8,262,471 B2* | 9/2012 | Van Luchene | 463/29 |
| 8,272,956 B2* | 9/2012 | Kelly et al. | 463/31 |
| 8,313,364 B2 | 11/2012 | Reynolds et al. | |
| 8,328,611 B2* | 12/2012 | Sano et al. | 463/9 |
| 8,328,643 B1 | 12/2012 | Osvald et al. | |
| 8,348,758 B2 | 1/2013 | Cram | |
| 8,388,450 B1 | 3/2013 | Mcguirk et al. | |
| 8,540,570 B2 | 9/2013 | Janis et al. | |
| 8,545,324 B2 | 10/2013 | Murase et al. | |
| 2001/0036851 A1* | 11/2001 | Sasaki et al. | 463/1 |
| 2002/0082065 A1* | 6/2002 | Fogel et al. | 463/8 |
| 2002/0082077 A1* | 6/2002 | Johnson et al. | 463/30 |
| 2002/0133592 A1* | 9/2002 | Matsuda et al. | 709/225 |
| 2003/0045203 A1* | 3/2003 | Sabe et al. | 446/356 |
| 2003/0093182 A1* | 5/2003 | Yokoyama | 700/245 |
| 2003/0119570 A1 | 6/2003 | Maroun | |
| 2003/0166414 A1* | 9/2003 | Sako et al. | 463/30 |
| 2003/0236119 A1* | 12/2003 | Forlines et al. | 463/41 |
| 2004/0009812 A1* | 1/2004 | Scott et al. | 463/28 |
| 2004/0053690 A1* | 3/2004 | Fogel et al. | 463/31 |
| 2004/0204127 A1* | 10/2004 | Forlines et al. | 455/566 |
| 2005/0243091 A1* | 11/2005 | Hong | 345/473 |
| 2006/0148569 A1 | 7/2006 | Beck | |
| 2006/0287032 A1 | 12/2006 | Yokoi | |
| 2007/0111795 A1* | 5/2007 | Choi et al. | 463/42 |
| 2007/0176363 A1* | 8/2007 | Bielman | 273/289 |
| 2007/0238499 A1 | 10/2007 | Wright | |
| 2008/0045285 A1* | 2/2008 | Fujito | 463/9 |
| 2008/0109392 A1* | 5/2008 | Nandy | 706/47 |
| 2008/0176658 A1 | 7/2008 | Wright | |
| 2008/0274811 A1* | 11/2008 | Ganz et al. | 463/42 |
| 2009/0118009 A1 | 5/2009 | Ganz | |
| 2009/0149233 A1* | 6/2009 | Strause et al. | 463/7 |
| 2010/0119155 A1* | 5/2010 | Kurahashi | 382/190 |
| 2011/0009190 A1* | 1/2011 | Scott et al. | 463/30 |
| 2011/0039622 A1* | 2/2011 | Levenson | 463/42 |
| 2011/0039623 A1* | 2/2011 | Levenson | 463/42 |
| 2011/0053693 A1 | 3/2011 | Wright | |
| 2011/0201423 A1 | 8/2011 | Borst et al. | |
| 2011/0256937 A1* | 10/2011 | Van Luchene | 463/42 |
| 2011/0263322 A1* | 10/2011 | Van Luchene | 463/29 |
| 2012/0238361 A1* | 9/2012 | Janis et al. | 463/31 |
| 2012/0238362 A1 | 9/2012 | Janis et al. | |
| 2012/0264511 A1* | 10/2012 | Marsland et al. | 463/31 |
| 2012/0264520 A1* | 10/2012 | Marsland et al. | 463/42 |
| 2013/0079143 A1 | 3/2013 | Mcguirk et al. | |
| 2013/0079145 A1 | 3/2013 | Lam et al. | |
| 2013/0088491 A1 | 4/2013 | Hobbs et al. | |
| 2013/0102379 A1 | 4/2013 | Sargent et al. | |
| 2013/0109474 A1 | 5/2013 | Login et al. | |
| 2013/0109479 A1 | 5/2013 | Ganz | |
| 2013/0231193 A1 | 9/2013 | Heatherly et al. | |
| 2013/0288757 A1 | 10/2013 | Guthridge et al. | |

OTHER PUBLICATIONS

Stokes, Michael et al. "A Standard Default Color Space for the Internet—sRGB." Published Nov. 5, 1996. Version 1.10. Accessed Mar. 4, 2013. <http://www.w3.org/Graphics/Color/sRGB.html>.*
"HSL and HSV." Wikipedia, the Free Encyclopedia. Accessed Mar. 3, 2014. 29 pages. <http://en.wikipedia.org/wiki/HSL_and_HSV>.*
"U.S. Appl. No. 13/244,925, Restriction Requirement mailed Feb. 6, 2012", 8 pgs.
"U.S. Appl. No. 13/244,925, Non Final Office Action Mailed Jul. 13, 2012", 23 pgs.
"A Bit More on Sheep Breeding", Retreived from internet <http://blog.farmville.com/2011/03/a-bit-more-on-sheep-breedi ng.htrnb>, (Mar. 28, 2011), 2 pgs.
"U.S. Appl. No. 13/174,713, Non Final Office Action mailed Jun. 12, 2013", 21 pgs.
"U.S. Appl. No. 13/244,925 , Response filed Oct. 15, 2012 to Non Final Office Action mailed Jul. 13, 2012", 15 pgs.
"U.S. Appl. No. 13/244,925, Examiner Interview Summary mailed Apr. 4, 2013", 4 pgs.
"U.S. Appl. No. 13/244,925, Final Office Action mailed Jan. 30, 2013", 19 pgs.
"U.S. Appl. No. 13/244,925, Notice of Allowance mailed Jun. 7, 2013", 11 pgs.
"U.S. Appl. No. 13/244,925, Response filed Apr. 30, 2013 to Final Office Action mailed Jan. 30, 2013", 12 pgs.
"FarmVille Blog explains more about Sheep Breeding", Retreived from internet <http://blog.games.com/2011/03/29/farmville-blog-explains-more-about-sheep-breeding/>, (Jan. 21, 2013), 2 pgs.
"Official Statement on FarmVille Sheep Breeding", The Ultimate FarmVille Secrets for the Champion, (Apr. 14, 2011), 3 pgs.
Osborne, Joe, "FarmVille English Countryside Cheats and Tips: Sheep Breeding 101", Reterived from internet <http://blog.games.com/2011 /03/16/farmville-english-countryside-sheep-breeding/>, (Mar. 16, 2011), 6 pgs.
"U.S. Appl. No. 13/174,713, Final Office Action mailed Nov. 19, 2013", 19 pgs.
"U.S. Appl. No. 13/174,713, Response filed Oct. 15, 2013 to Non Final Office Action mailed Jun. 12, 2013", 15 pgs.
"U.S. Appl. No. 13/174,713, Non Final Office Action mailed Apr. 11, 2014", 19 pgs.
"U.S. Appl. No. 13/174,713, Response filed Mar. 18, 2014 to Final Office Action dated Nov. 19, 2013", 14 pgs.
"U.S. Appl. No. 13/174,713, Examiner Interview Summary mailed Aug. 4, 2014", 4 pgs.
"U.S. Appl. No. 13/174,713, Non Final Office Action mailed Oct. 20, 2014", 7 pgs.
"U.S. Appl. No. 13/174,713, Response filed Jul. 21, 2014 to Non-Final Office Action dated Apr. 11, 2014", 16 pgs.

* cited by examiner

| # Love Potions | Time To Breed | Chances of Breeding Success |
|---|---|---|
| 0 | 24 hours | 50% |
| 1 | 12 hours | 60% |
| 2 | 6 hours | 70% |
| 3 | 3 hours | 80% |
| 4 | 1 hour | 90% |
| 5 | Instant | 100% |

FIG. 6

| Key (Initial): | Example Value: |
|---|---|
| Name (N) | Ewe2 |
| Gender (G): | F |
| Breeder (U): | 15710717 (unique id) |
| Base Color (B): | |
|    Hue (H): | 9f (Hex) (0-240, decimal) |
|    Saturation (S): | 4 (Hex) (0-15, decimal) |
|    Intensity (V): | C (Hex) (0-15, decimal) |
| Pattern (P): | |
|    Hue (H): | 94 (Hex) (0-240, decimal) |
|    Saturation (S): | f (Hex) (0-15, decimal) |
|    Intensity (V): | f (Hex) (0-15, decimal) |
| Type (T): | b (Maps to stripes) |

"{"N":"Ewe2","U":"15710717",

$$\begin{bmatrix} a[0] & a[1] & a[2] & a[3] & a[4] \\ a[5] & a[6] & a[7] & a[8] & a[9] \\ a[10] & a[11] & a[12] & a[13] & a[14] \\ a[15] & a[16] & a[17] & a[18] & a[19] \end{bmatrix} \begin{bmatrix} baseR & patternR & auxR & 0 & 0 \\ baseG & patternG & auxG & 0 & 0 \\ baseB & patternB & auxB & 0 & 0 \\ 0 & 0 & 0 & 1 & 0 \end{bmatrix}$$

← 400

← 402 destR = (a[0]*srcR) + (a[1]*srcG) + (a[2]*srcB) + (a[3]*srcA) + a[4]
destG = (a[5]*srcR) + (a[6]*srcG) + (a[7]*srcB) + (a[8]*srcA) + a[9]
destB = (a[10]*srcR) + (a[11]*srcG) + (a[12]*srcB) + (a[13]*srcA) + a[14]
destA = (a[15]*srcR) + (a[16]*srcG) + (a[17]*srcB) + (a[18]*srcA) + a[19]

FIG. 15

ONLINE GAME WITH ANIMAL-BREEDING MECHANIC FOR COMBINING VISUAL DISPLAY PARAMETERS

CROSS-REFERENCE TO RELATED APPLICATIONS

This application is a continuation of and claims the benefit of priority under 35 U.S.C. §120 to U.S. patent application Ser. No. 13/174,713, filed on Jun. 30, 2011, which claims the benefit of U.S. Provisional Application No. 61/453,303 ("Online Game with Animal Breeding Mechanic"), filed Mar. 16, 2011, which are incorporated herein by reference in their entirety.

TECHNICAL FIELD

The present disclosure relates to games and applications in general and, in particular embodiments, to computer-implemented online games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides the outcomes of events, and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., MICROSOFT INTERNET EXPLORER, MOZILLA FIREFOX, GOOGLE CHROME).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and so forth. A player character in an online poker game may be able to play at specific tables, place bets of virtual currency for certain amounts, play or fold certain hands, play in a online poker tournament, and so forth.

BRIEF DESCRIPTION OF THE DRAWINGS

FIG. 6 is a table that shows values associated with an example embodiment and the user interfaces shown in FIG. 7A and FIG. 7B.

FIG. 12 illustrates parameter-set values for a virtual animal in accordance with an example embodiment.

FIG. 15 shows aspects of the combination of specific virtual-animal parameter sets with source artwork in accordance with an example embodiment.

DESCRIPTION OF EXAMPLE EMBODIMENTS

Figure 1:
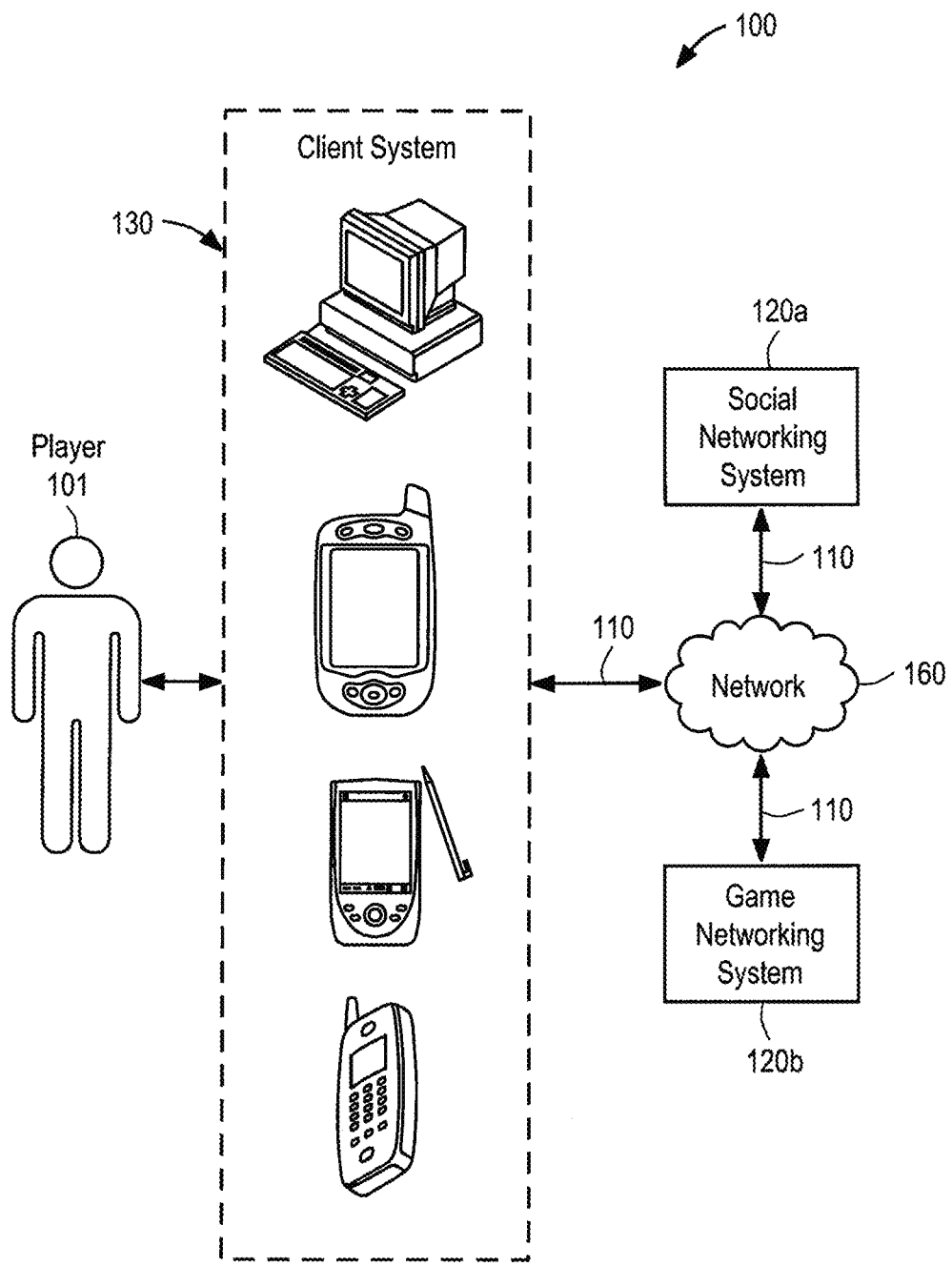
FIG. 1 illustrates an example of a system for implementing particular disclosed embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and so forth.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages the game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, and game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HyperText Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs

In an online multiplayer game, players may control player characters (PCs), while a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, while sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. In general, this disclosure assumes that at least one entity of a social graph is a player or player character in an online multiplayer game, although this disclosure is applicable to players or player characters that are not characterized as entities of a social graph.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., FACEBOOK, FRIENDSTER, MYSPACE). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game networking system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
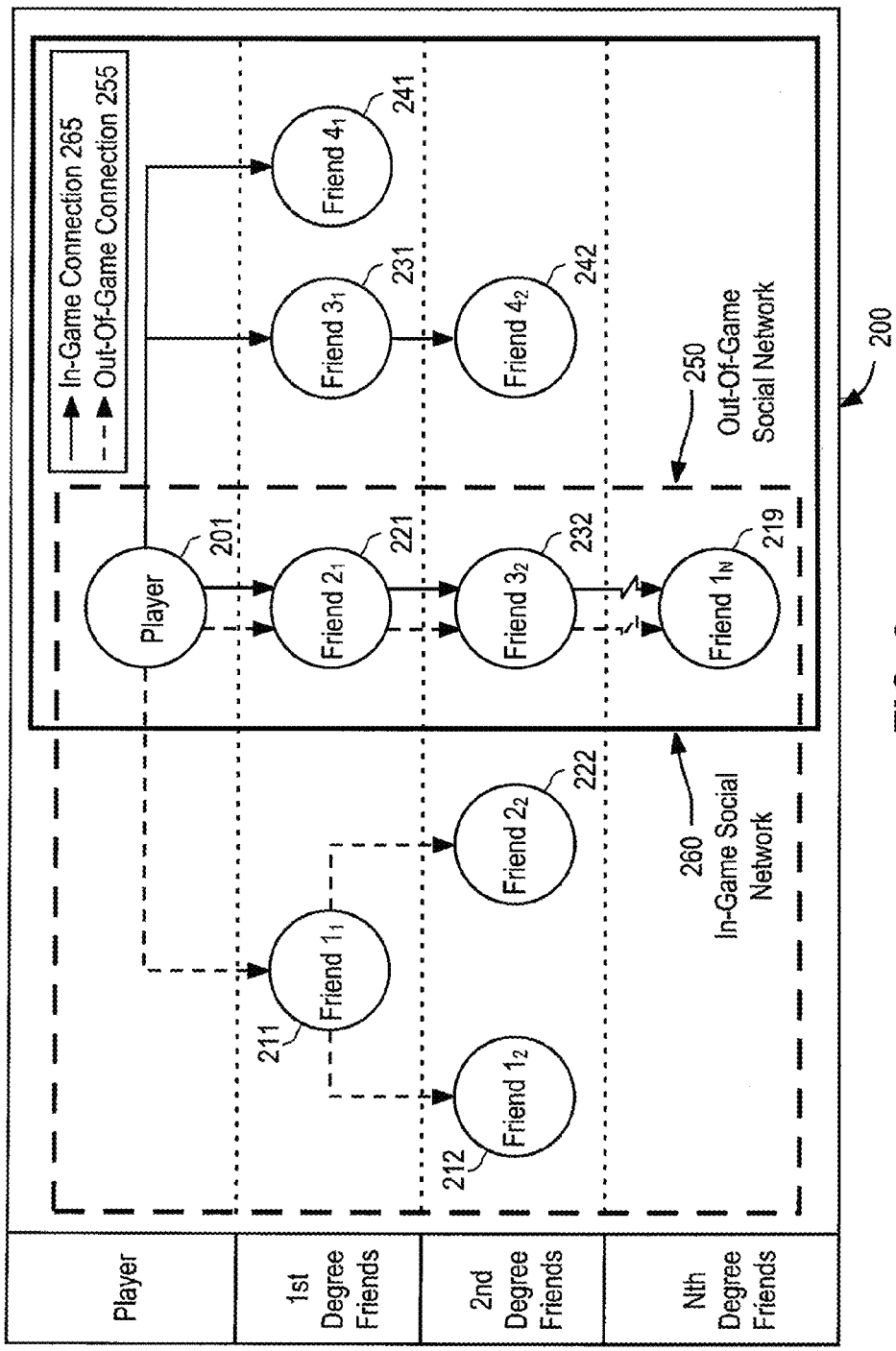
FIG. 2 illustrates an example social network.

FIG. 2 shows an example of a social network within a social graph. As shown, Player 201 can be associated, connected or linked to various other users, or "friends," within the social network 200. These associations, connections or links can track relationships between users within the social network 200 and are commonly referred to as online "friends" or "friendships" between users. Each friend or friendship in a particular user's social network within a social graph is commonly referred to as a "node." For purposes of illustration and not by way of limitation, the details of the social network 200 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In the social network 200, Player 201 has four first-degree friends. That is, Player 201 is directly connected to Friend $1_1$ 211, Friend $2_1$ 221, Friend $3_1$ 231, and Friend $4_1$ 241. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211, and second-degree Friend $4_2$ 242 is connected to Player 201 via his first-degree Friend $3_1$ 231. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and Friend $4_2$ 242 is a second-degree friend. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems and Game Interfaces

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

Figure 19:
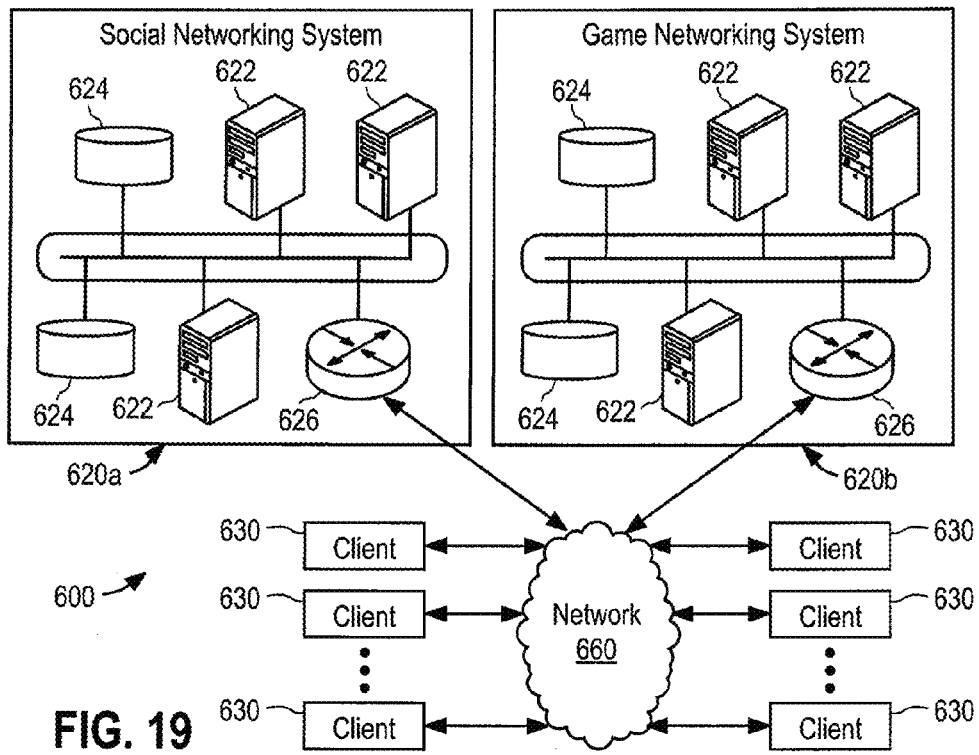
FIG. 19 illustrates an example network environment.

An online game can be hosted by a game networking system, which can be accessed over any suitable network with an appropriate client system (e.g., as in FIG. 19). A player may have a game system account on a game system, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on the game system and merely accessed via the third-party website. The embedded online game can be hosted solely on a server of the game system or use a third-party vendor server. In addition, any combination of the functions of the present disclosure can be hosted on or provided from any number of distributed network resources. For example, one or more executable code objects that implement all or a portion of the game can be downloaded to a client system for execution.

A webpage-based game interface for an online game may be accessed by a browser client. In various embodiments, a user of a client system 130 can use a browser client to access the online game over the Internet (or other suitable network). A game interface may be automatically generated and presented to the user in response to the user visiting or accessing the game operator's website or a third-party's website from client system 130 with a browser client. Game networking system 120*b* can transmit data to client system 130, allowing it to display the game interface, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Typically a game interface is configured to receive signals from the user via client system 130. For example, the user may click on a game interface, or enter commands from a keyboard or other suitable input device. The game engine can respond to these signals to allow game play. The display of a game interface may change based on the output of the game engine, the input of the player, and other signals from game networking system 120*b* and client system 130.

Typically a game interface can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user may engage in specific in-game actions or activities by providing input to the game interface.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once the selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Animal-Breeding Mechanic

Figure 3:
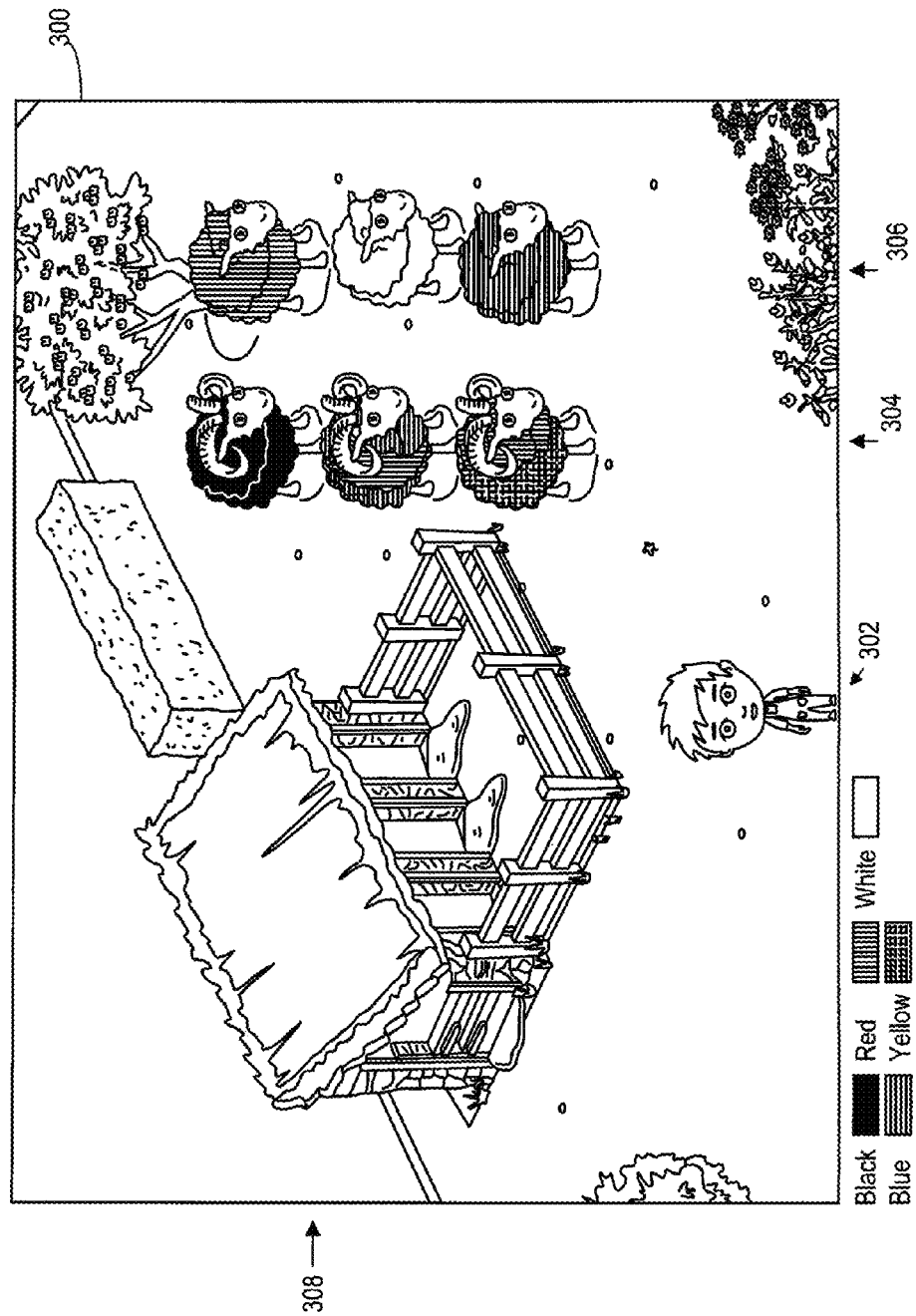
FIG. 3 illustrates a user interface in accordance with an example embodiment.
Figure 4:
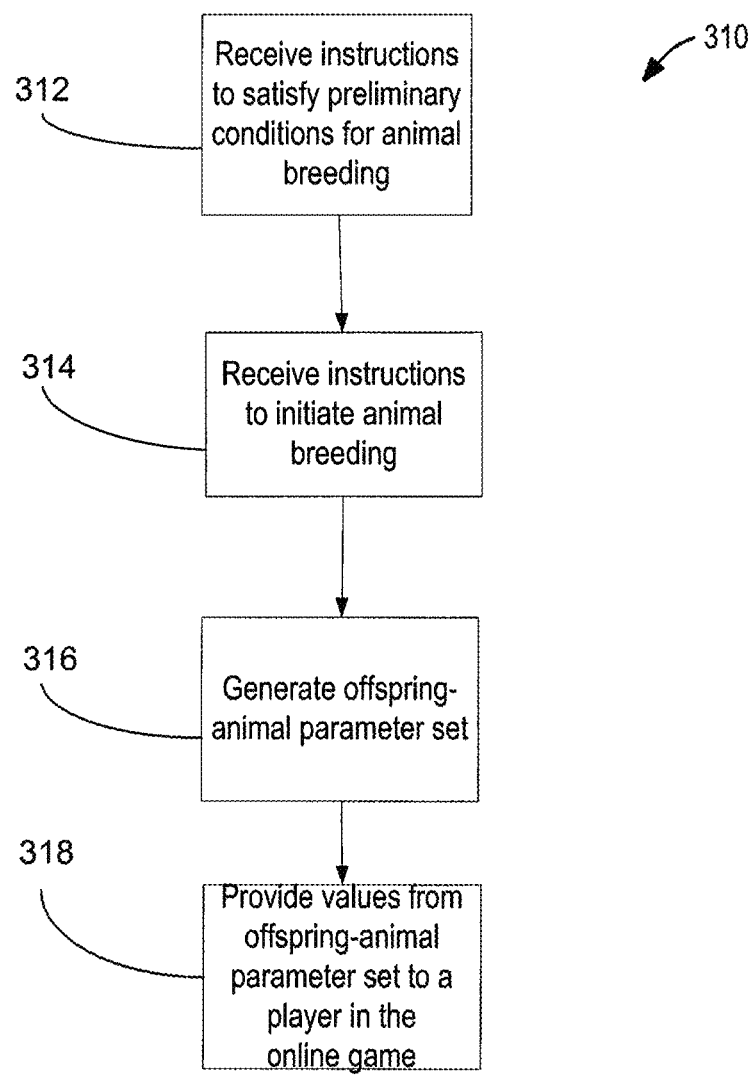
FIG. 4 is a flowchart that illustrates a method of breeding virtual animals in accordance with an example embodiment.

In accordance with certain embodiments, an animal-breeding mechanic facilitates the breeding of virtual animals in an online a gaming environment. FIG. 3 shows an example user-interface display 300 that represents a virtual farmyard setting including a player icon 302, a row of three male sheep (e.g., rams 304), a row of three female sheep (e.g., ewes 306), and a stable 308. FIG. 4 shows a flowchart that illustrates a method 310 of breeding virtual animals in an online game according to an example embodiment. A first operation 312 includes optional instructions to satisfy preliminary conditions that may or may not be required depending on the game rules. In some embodiments the player may be required to provide a shelter such as the illustrated stable 308, for example, by obtaining corresponding building materials. This may require using virtual currency to buy materials to build the stable 308, where this construction may also require virtual currency or some user operations (e.g., dragging and dropping materials to the screen location). A second operation 314 includes receiving instructions for initiating an animal breeding in the online game. As discussed below in greater detail, the instructions typically include selecting a male animal and a female animal of a virtual animal type (e.g., rams 304 and ewes 306), where each of the selected animals is visually characterized by a corresponding parameter set that includes one or more color parameters. Next, a third operation 316 includes generating from the male-animal parameter set and the female-animal parameter set, an offspring-animal parameter set that visually characterizes an offspring animal of the virtual animal type. In a fourth operation 318, values from the offspring-animal parameter set are provided to a player in the online game (e.g., to a corresponding user machine that provides access to the online game).

Figure 5:
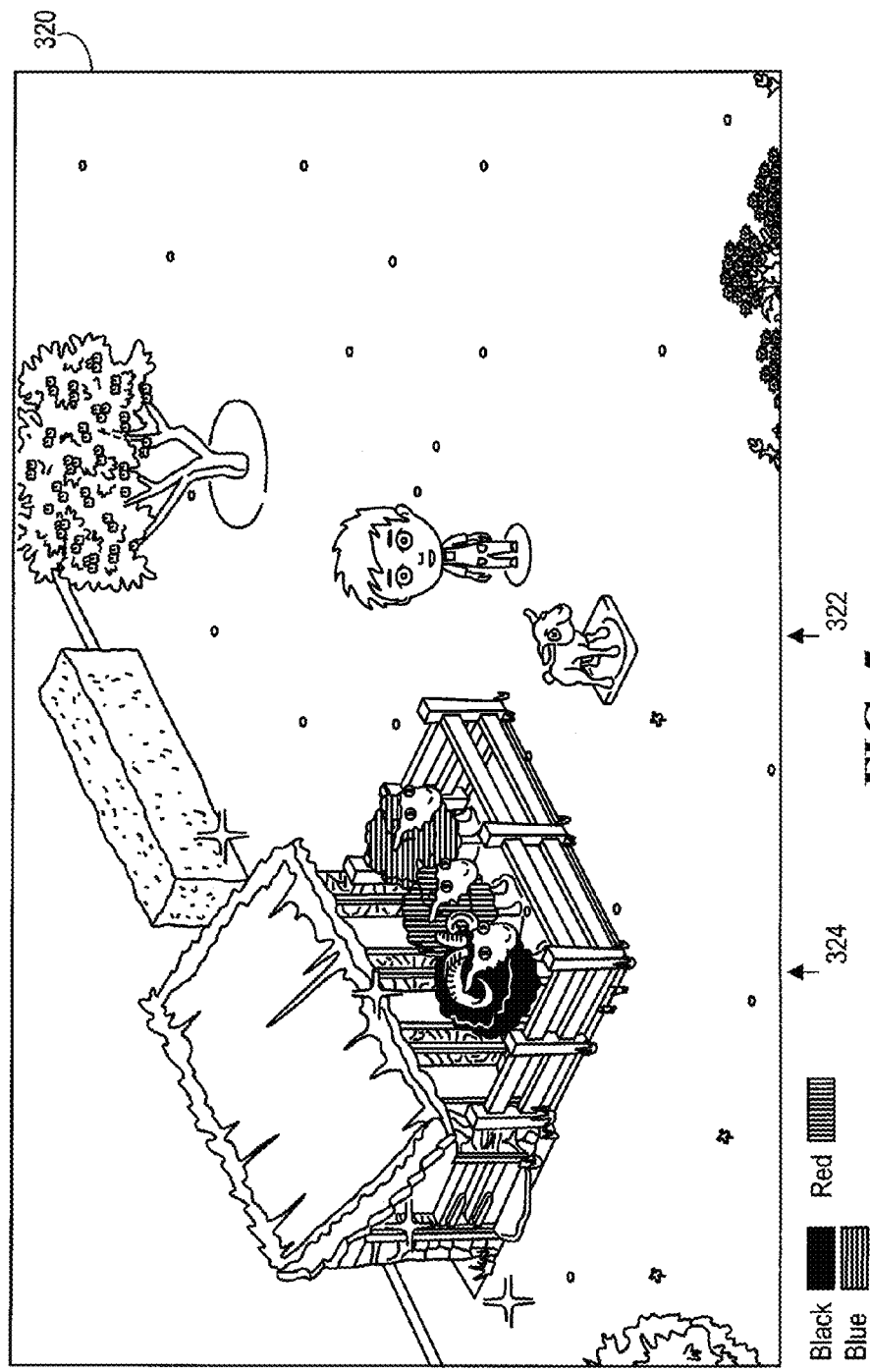
FIG. 5 illustrates a user interface in accordance with an example embodiment.

In a specific example embodiment with reference to FIG. 3, a player may build (or otherwise obtain) the stable 308, and initiate animal breeding by selecting one of the rams 304 and one of the ewes 306 so that an offspring animal is generated and sheltered in the stable 308. FIG. 5 shows the resulting display 320 where the offspring animal 322 stands in front of the stable 324, which includes adult sheep (including the parent ram and the parent ewe). Providing values from the offspring-animal parameter set to a player (e.g., as in the fourth operation 318) enables the generation of the display 320 locally (e.g., at the user machine corresponding to the player).

Figure 7A:
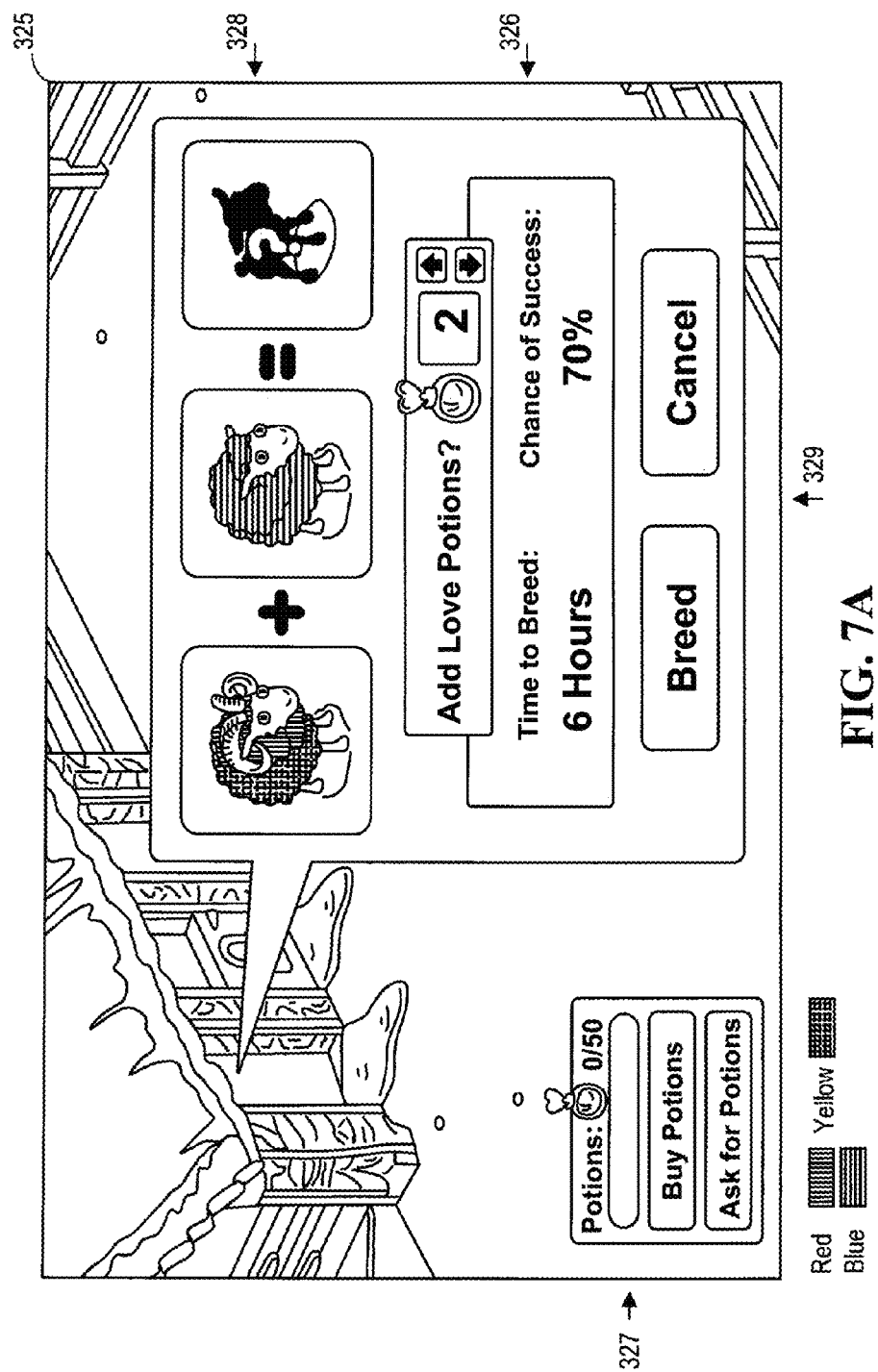
FIG. 7A illustrates a user interface related to the table shown in FIG. 6 in accordance with an example embodiment.

In some example embodiments, the successful generation of the offspring animal 322 is not guaranteed and may be controlled by a probability calculation (e.g., with a random number generator). FIG. 6 shows a table for an example embodiment where the "time to breed" and "chances of breeding success" are initially set at 24 hours and 50%, respectively, but the addition of one or more "love potions" speeds up the process and increases the likelihood of success. Depending on the operational setting, these "love potions" may be obtained as a gift from another player or from a purchase with virtual currency. FIG. 7A shows a corresponding user-interface display 325 that includes a current-value display 326 for the "time to breed" and the "chance of success" with an option to add additional "love potions." The user-interface display 325 also includes a menu item 327 that enables the player to obtain a supply of love potions either by purchasing them with virtual currency or by requesting them as gifts from other players. An equation-like representation 328 shows the selected male animal (i.e., a ram) and female animal (i.e., a ewe) with an addition sign ("+") between them. On the right-hand side of the equation, a question mark ("?") is used to indicate that the specific details of the potential offspring animal are unavailable at this time. When the player is satisfied with the current values 326 for the "time to breed" and the "chance of success," another menu item 329 enables the player to initiate (or alternatively to cancel) the breeding process.

Figure 7B:
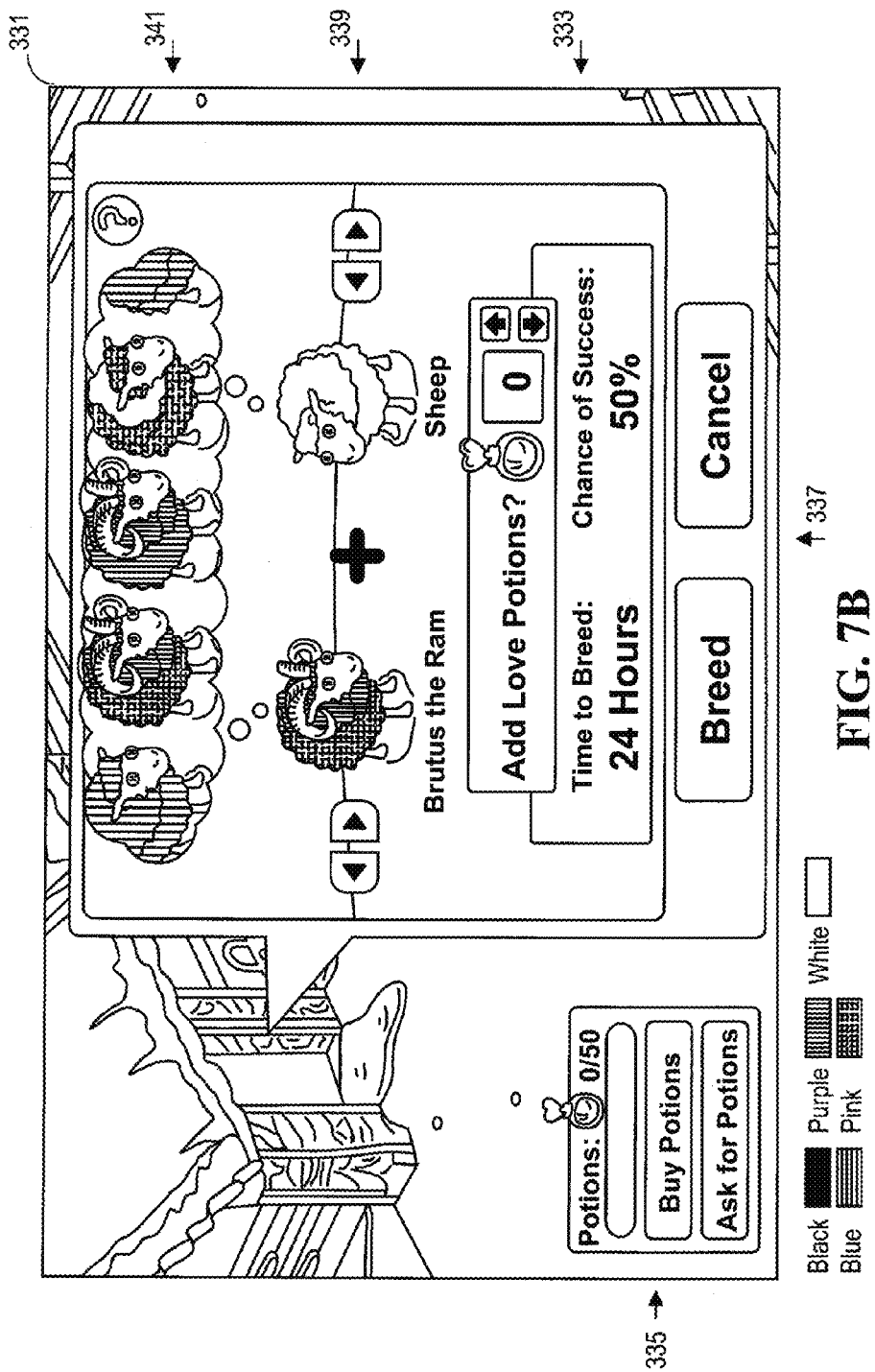
FIG. 7B illustrates a user interface related to the table shown in FIG. 6 in accordance with an example embodiment.

FIG. 7B shows an alternative user-interface display 331 with items similar to the user-interface display 325 of FIG. 7A including a current-value display 333 for the "time to breed" and the "chance of success" with an option to add additional "love potions," a menu item 335 that enables the player to obtain a supply of "love potions," and a menu item 337 that enables the player to initiate or cancel the breeding process. The equation-like representation 328 of FIG. 7A has been replaced by a parental representation 339 of the male and female animals plus a potential-offspring representation 341 that includes potential offspring with different markings and colors. The potential-offspring representation 341 may be animated so that the potential offspring animals move from left to right in the display (e.g., as in a "conga line"). As shown here, the parental representation 339 includes left and right arrow tabs to enable the player to toggle through possible male and female animal choices and then observe the resulting potential-offspring representation 341. This example embodiment enables the user to preview possible offspring choices that may be determined randomly as described below. In some embodiments an alternative menu choice may enable the player to select a preferred offspring animal from the potential-offspring representation 341 (e.g., in exchange for virtual currency).

Figure 8:
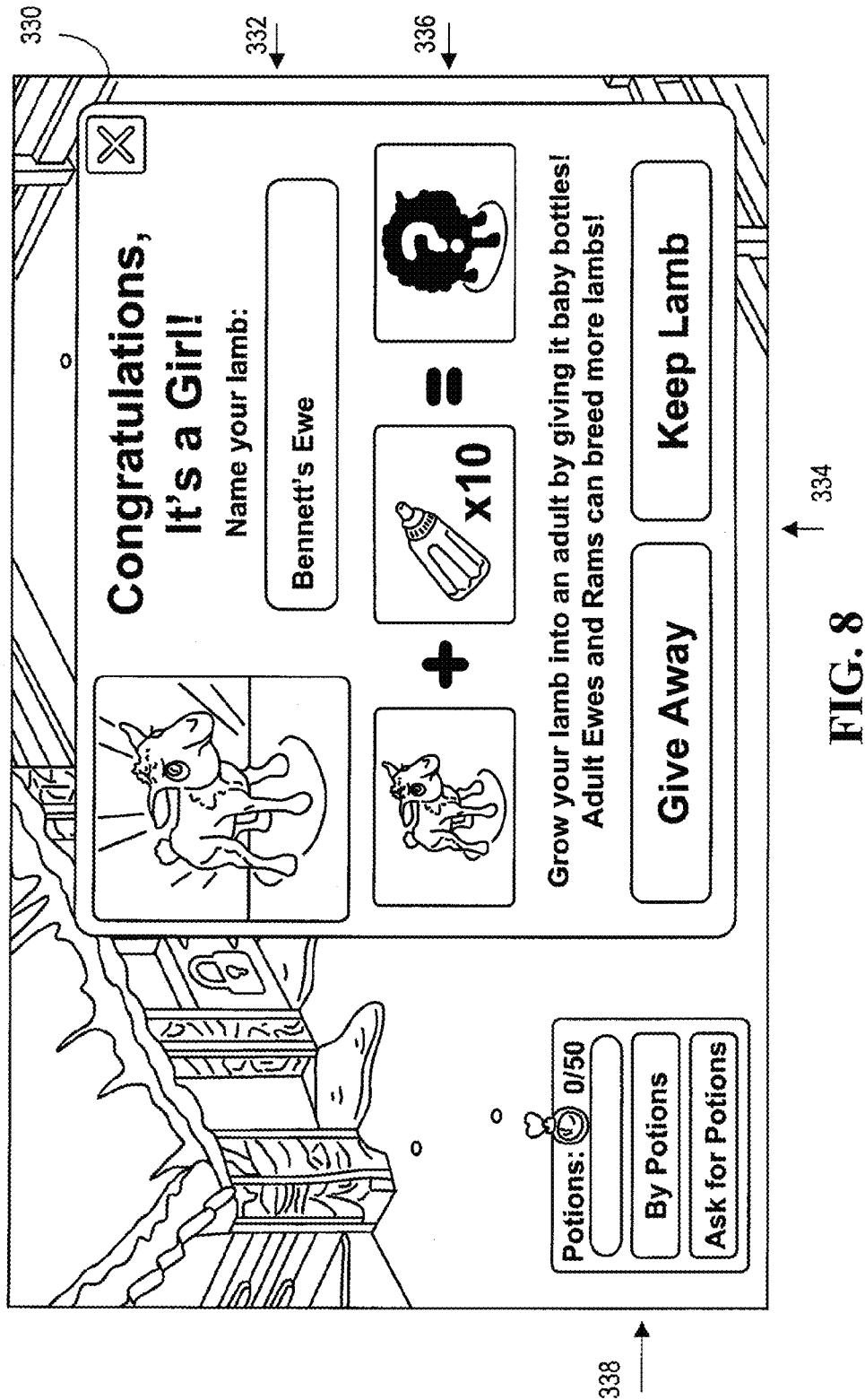
FIG. 8 illustrates a user interface in accordance with an example embodiment.

In some example embodiments, the introduction of the offspring animal 322 may be accompanied by a choice for the player to give the offspring animal to another player or keep the offspring animal. FIG. 8 shows a user-interface display 330 that includes a menu item 332 that enables the player to name the virtual animal (e.g., lamb) and another menu item 334 that enables the user to choose whether to give away or keep the virtual animal. When keeping the virtual animal, another menu item 336 enables the player to obtain nourishing potions (e.g., baby bottles) to bring the offspring animal to adulthood so that the corresponding adult male or adult female can then be used as a parent animal in subsequent animal breeding. As shown in FIG. 8, these nourishing potions may be obtained by purchasing them with virtual currency or by requesting them as gifts from other players.

Figure 9:
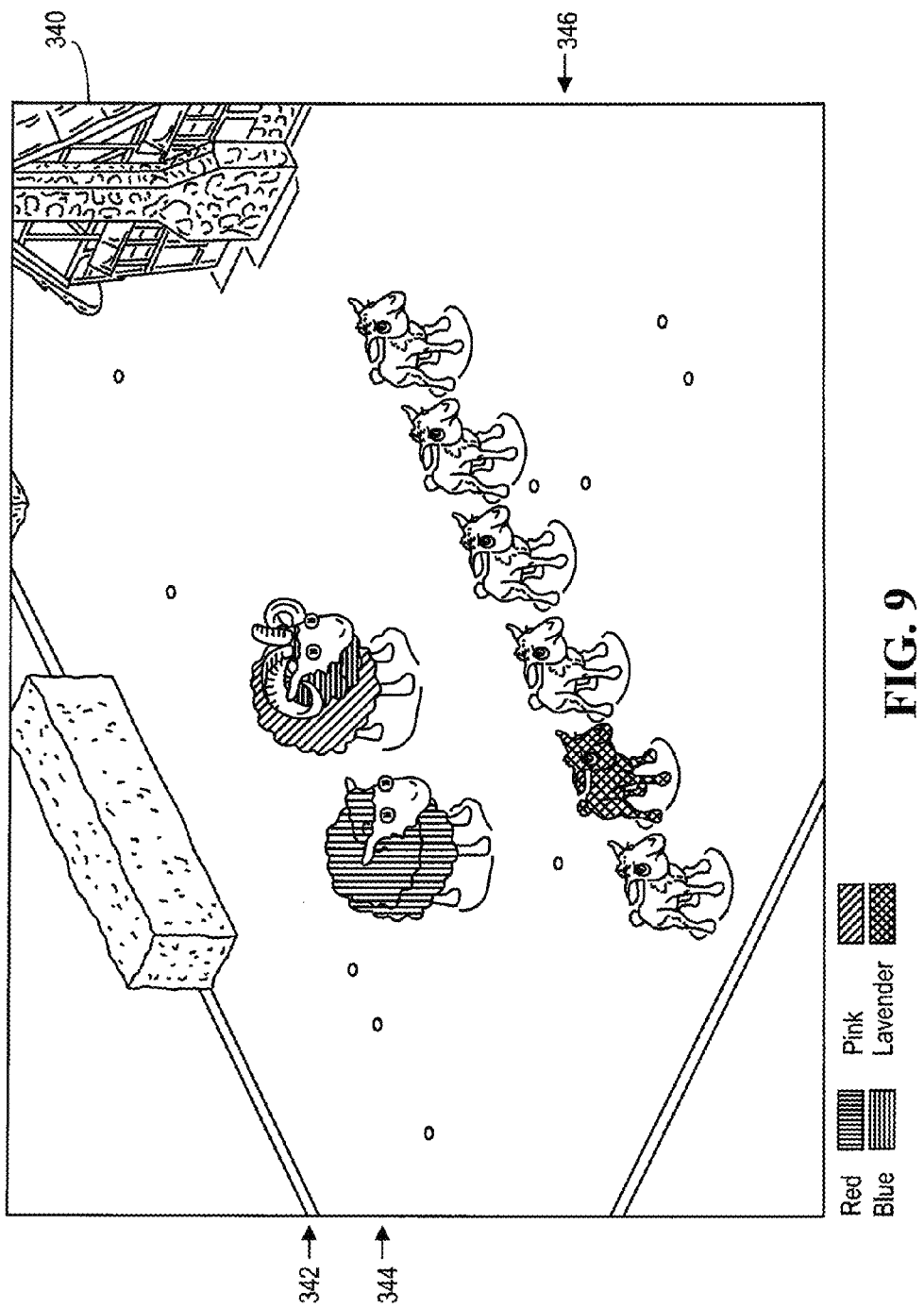
FIG. 9 illustrates a user interface in accordance with an example embodiment.
Figure 10:
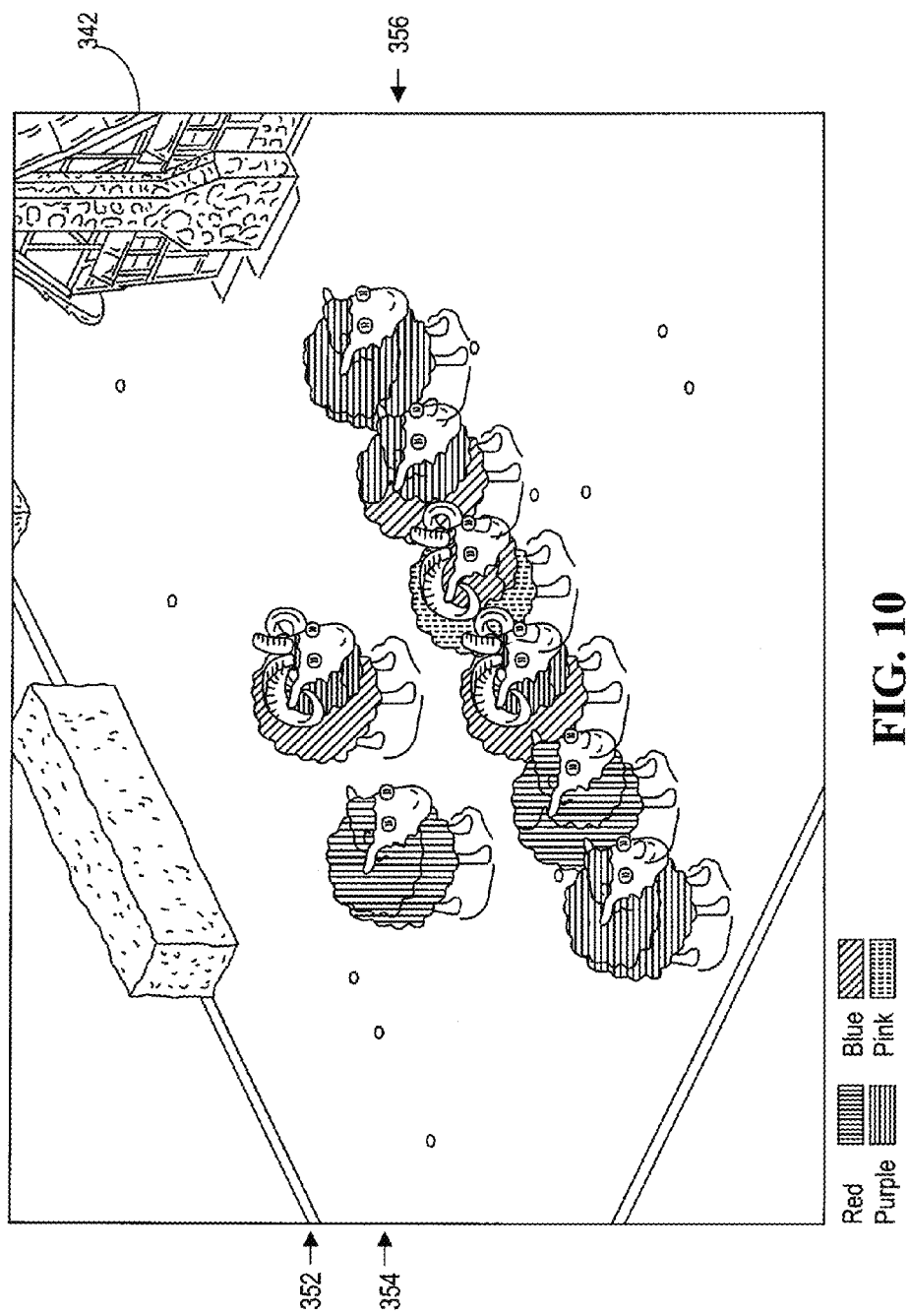
FIG. 10 illustrates a user interface in accordance with an example embodiment.

As illustrated in FIG. 5, the offspring animal 322 may be shown in the display 320 as a smaller animal with lightened (or desaturated) colors and no visible pattern markings so that bringing the offspring animal 322 to maturity (e.g., as in FIG. 8) reveals the full details of the animal's features. FIG. 9 shows a display 340 with an adult male animal (ram 342 with horns) and an adult female animal (ewe 344 without horns) together with a row of six offspring animals 346. FIG. 10 shows an updated display 342 with the ram 352 and the ewe 354, where the six offspring animals 346 in FIG. 9 have been replaced by the corresponding six adult animals 356 including two rams (indicated by horns) and four ewes. Depending on the operational setting, the display of the offspring animals 346 as in FIG. 9 may show generic colors (e.g., grey) or may show muted versions of the corresponding adult colors.

Figure 11:
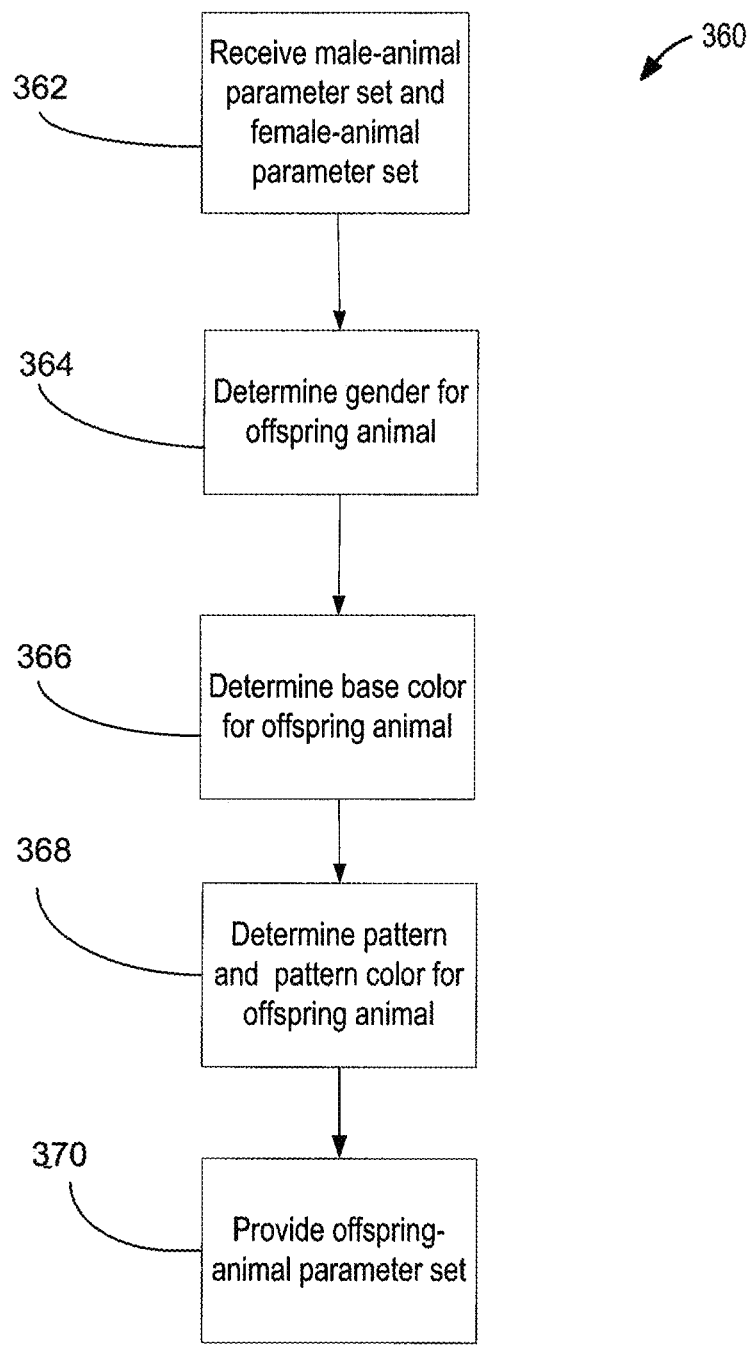
FIG. 11 is a flowchart that illustrates a method of generating an offspring-animal parameter set in accordance with an example embodiment.

FIG. 11 shows details of an example method 360 of generating an offspring-animal parameter set from a male-animal parameter set and a female-animal parameter set (e.g., as in the third operation 316 of FIG. 4). A first operation 362 includes receiving a male-animal parameter set and a female-animal parameter set that visually characterize corresponding male and female virtual animals, possibly with respect to source artwork as discussed below. FIG. 12 shows a table 372 that includes parameter-set values where colors are represented by values for Hue, Saturation and Intensity (HSV). The table 372 includes values for name, gender, breeder (e.g., a player identification (ID)), base color HSV, pattern color HSV, and pattern type. The pattern type generally refers to a visually distinctive design that is overlaid on the solid base color of the virtual animal. Typical pattern types include stripes, stars, dots and "hooded" (e.g., the lower two rams 304 in FIG. 3). In general, patterns are optional. For example the ewes 306 in FIG. 3 have no patterns. In this case, the pattern type may be set to "none" and the corresponding HSV values are ignored. Also shown in FIG. 12 is a serial string representation 374 of the parameter set that is applicable to JAVA applications as a Javascript Object Notation (JSON) representation of the virtual animal features.

In the first operation 362 of FIG. 11, a male-animal parameter set and the female-animal parameter set are received or specified. Each parameter set includes values corresponding to the table 372 in FIG. 12 where Gender="M" for the male animal and Gender="F" for the female animal. The operations of FIG. 11 provide a corresponding parameter set for the offspring animal. A second operation 364 includes determining the gender of the offspring animal. Typically this can be done by setting probability values for genders (e.g., 50% M, 50% F) and using a conventional random number generator to determine the resulting gender. In some operational settings it may be desirable to bias the probabilities, for example, so that one of the genders is less common and more desirable (e.g., 25% M, 75% F).

A third operation 366 includes determining the base color of the offspring animal. For example, a base color may be randomly selected from one of the parent animals based on a probability distribution (e.g., 50% M, 50% F). Then, to provide additional color variations, random variations can be taken in a neighborhood of this base color. For example, in the table 372 of FIG. 12, HSV values for the base color include Hue (H) values that range from 0 to 240, Saturation (S) values that range from 0 to 15, and Intensity (V) values that range from 0 to 15. Random variations for each component can then be determined from a suitable range so that relatedness to the selected parent is still visually apparent (e.g., ±15 for H, ±1 for S, ±1 for V). Additionally, because of the sensitivity of the displayed color to variations in Saturation and Intensity, it may be desirable to further limit these variations (e.g., 20% chance of no S-variation, 20% chance of no V-variation). A fourth operation 368 includes determining the pattern and pattern color of the offspring animal. This process can be handled similarly to the determination of the base color above, for example, by randomly selecting a pattern and pattern color from one of the parents and applying a random variation about that selected pattern color. In some operational settings it may be desirable, for example, to deterministically select the pattern from one of the parents according to gender (e.g., always from the male parent) in order to make that gender more desirable for the online game. In some cases it may be desirable to further limit the number of patterns by including an additional randomized filter (e.g., only adopt the selected pattern 50% of the time). A sixth operation 370 includes providing the offspring-animal parameter set to the online game system or to a user of the system (e.g., as a serial string representation 374 as in FIG. 12).

The operations of FIG. 11 may be further modified by including a memory modification to the randomization process to avoid undesirable outcomes in small populations. For example, after three consecutive female offspring animals are randomly bred to a specific male animal and a specific female animal, the next offspring animal may be deterministically set to male. Similarly, after three consecutive of pattern-less offspring animals are randomly bred to a specific male animal with a pattern marking and a specific female animal, the next offspring animal may be deterministically set to include a pattern marking.

The offspring-animal parameter set shown in table 372 of FIG. 12 includes base color values and pattern color values that can be used to display an adult animal (e.g., rams 304 and ewes 306). However, in order to encourage bringing the offspring animal to maturity (e.g., as in FIG. 8), it may be preferable to present the offspring animal with lightened (or desaturated) colors and no pattern markings as discussed above with respect to FIGS. 9 and 10. With reference to the table 372 in FIG. 12, this effect for the offspring animal can be accomplished by lightening the base color and ignoring the pattern altogether. That is, although the offspring-animal parameter set is maintained for future displays of the mature animal (i.e., as a ram or a ewe), the immature offspring animal can be displayed using a small saturation value (e.g., S=0 for grey scale) and ignoring any pattern markings.

For any of the above-described virtual animals (e.g., male, female or offspring) the parameter set can be used in combination with the source artwork to display the virtual animal, where the source artwork may correspond to an artistic rendering of the virtual animal with separate fields for the base color, the pattern color (if applicable), and possibly any auxiliary colors. For example, a distinct unit of source artwork may be available for male and female animals of each pattern type including no pattern type. In the case where offspring animals are undifferentiated for gender and patterns, a single unit of source artwork may be used for offspring animals although additional units may also be used (e.g., for each gender and for a range of maturity levels corresponding to a range of ages).

Figure 13:
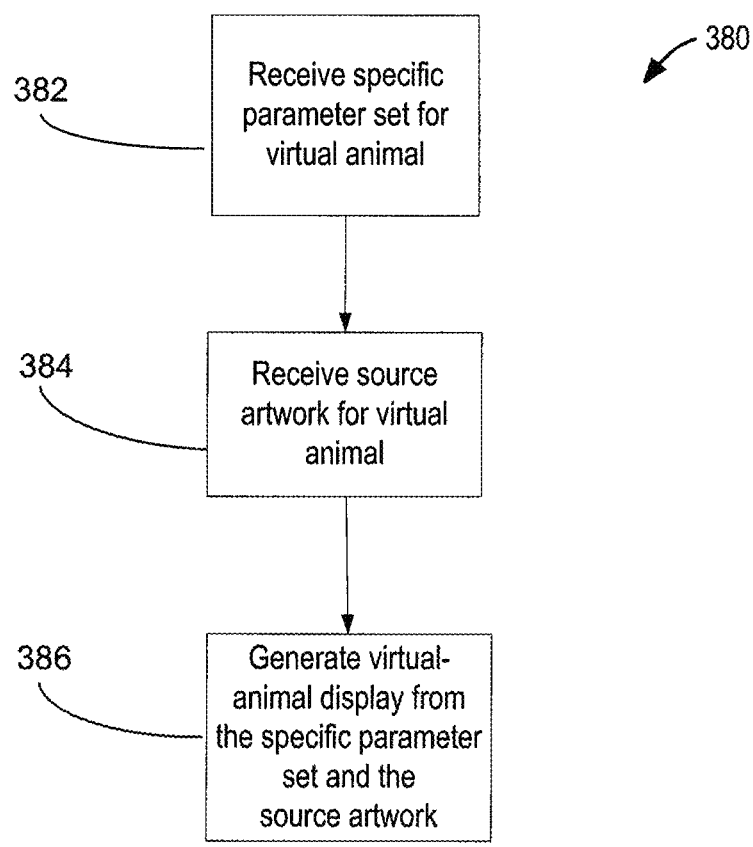
FIG. 13 is a flowchart that illustrates a method of generating pixel values for a virtual animal in accordance with an example embodiment.

FIG. 13 shows a method 380 for generating display values (e.g., pixel values) for a virtual animal according to an example embodiment. A first operation 382 includes receiving a specific parameter set (e.g., the serial string representation 374 in FIG. 12). A second operation 384 includes receiving the source artwork as described below with reference to FIG. 14. A third operation 386 includes generating the virtual animal display from the specific parameter set and the source artwork. As discussed below with reference to FIG. 15, this process may include substituting combinations of color-channel values corresponding to the specific parameter set for color-channel values from the source artwork. Typically, these operations are carried out at the client machine corresponding to the player so that the pixel values are determined locally.

Figure 14:
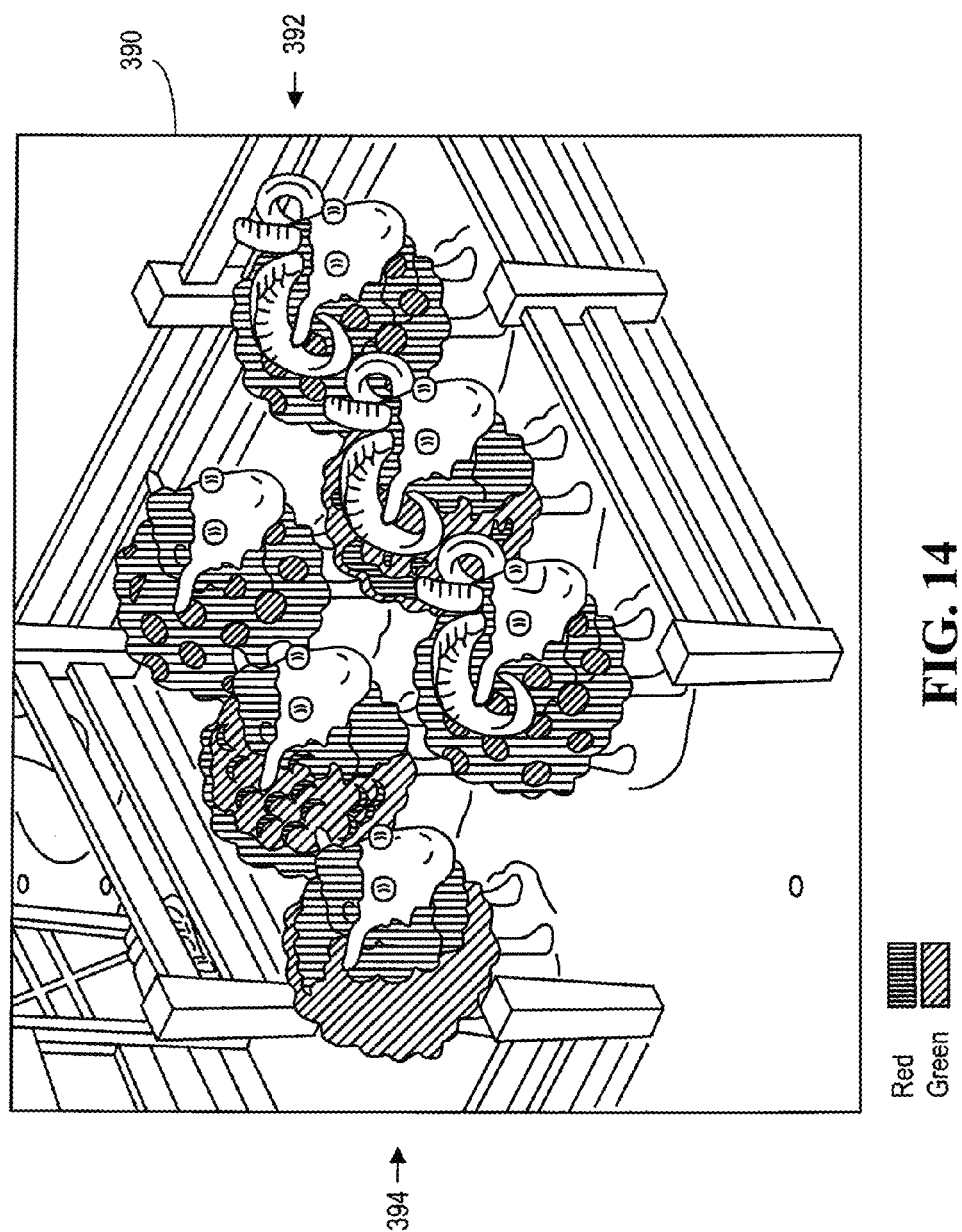
FIG. 14 shows a display that illustrates source artwork in accordance with an example embodiment.

FIG. 14 shows a display 390 that illustrates the source artwork for virtual animals with separate fields for the base color, the pattern color, and auxiliary colors. A row of three rams 392 includes (starting from the right) a first ram with a spotted pattern, a second ram with a hooded pattern and a third ram with a spotted pattern. A row of three ewes 394 includes (starting from the right) a first ewe with a spotted pattern, a second ewe with a hooded pattern and a third ewe with a hooded pattern. Conventionally, the source artwork uses three color channels (e.g., Red-Green-Blue (RGB)) to separate the fields that are modified by values from the specific parameter set. (Optionally, an Alpha channel may be added to include a transparency effect and to give four color channels Red-Green-Blue-Alpha (RGBA).) Here, the red channel corresponds to the base color and the green channel corresponds to the pattern color, so that these portions of the source artwork will be filled with colors corresponding to the specific parameter set. Additionally, the blue channel is used for auxiliary colors that are unaffected by the specific parameter set. For example, this can be set for a brown color suitable for the rams' horns, used to give a grey color by temporarily re-setting the saturation (S) to desaturate the color (e.g., S=0 for grey scale), or used to give a black color by temporarily re-setting the intensity (V) to eliminate other colors (e.g., V=0 for black).

FIG. 15 shows aspects of the combination of the specific parameter set and the source artwork (e.g., the third operation 386 in FIG. 13). A color matrix 400 is populated by RGB values corresponding to the specific parameter set (e.g., by a conventional transformation between the HSV values in FIG. 12 and corresponding RGB values). The first three rows of the first column take RGB values for the base color, the first three rows of the second column take RGB values for the pattern color, and the first three rows of the third column take RGB values for the auxiliary color (e.g., auxR=2.64, auxG=1.90, and auxB=1.20 for brown horns). The fourth column and fourth row correspond to the A channel (or alpha channel) which relates to transparency and is not used for this example. The fifth column is an offset that is not used for this example. In FIG. 15 the source artwork is characterized by srcR for the red channel, srcG for the green channel, srcB for the blue channel, and srcA for the alpha channel (not used here). The destination RGBA values 402 (e.g., pixel values for the display) are given by (destR, destG, destB, destA) and expressed by matrix operations of the color matrix 400 on the source RGBA values (srcR, srcG, srcB, srcA). In a typical scaling the source RGBA values (srcR, srcG, srcB, srcA) and the destination RGBA values (destR, destG, destB, destA) are scaled as integers in the range 0-255, so that calculated values out-side that range are clamped to the range. In some operational settings, nonzero alpha channel values and the offset values (e.g., fifth column of the color matrix 400) may be included in the calculations. For example, the alpha channel is typically used to show transparency, where, for the range 0-255, 0 indicates complete transparency and 255 indicates opacity.

Figure 16:
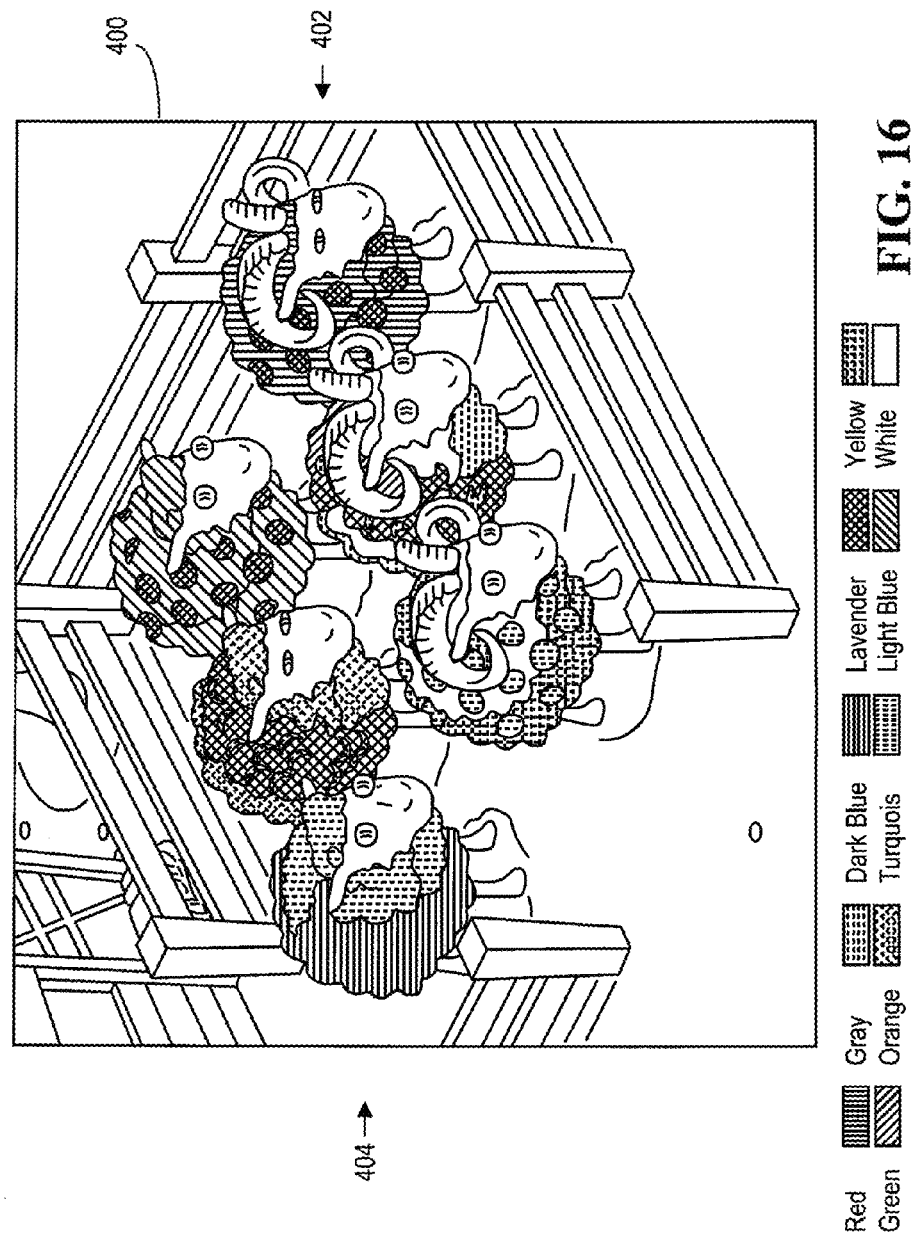
FIG. 16 shows a display that illustrates a combination of specific virtual-animal parameter sets with the source artwork shown in FIG. 14.

FIG. 16 shows a display 400 where the sheep in FIG. 14 have been colored by RGB values that correspond to various parameter sets. That is, starting from a parameter set (e.g., a serial string representation 374 as in FIG. 12), HSV values for base color and pattern color are transformed to corresponding RGB values by conventional transformations. Then, for source artwork corresponding to a ewe or ram or offspring with a given pattern or no pattern, a color matrix 400 as in FIG. 15 is used to transform from source artwork color values to the RGB values corresponding to the given parameter set. FIG. 16 shows the resulting display 400 where a row of three rams 402 corresponds to the row of three rams 392 in the source artwork shown in FIG. 14 and a row of three ewes 404 corresponds to the row of three ewes 394 in the source artwork shown in FIG. 14. As illustrated by these figures, the source artwork provides a template that enables a variety of displays with different colorings for the virtual animals.

Additional embodiments relate to an apparatus for carrying out any one of the above-described methods (e.g., as a game mechanic), where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more modular units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Figure 17:
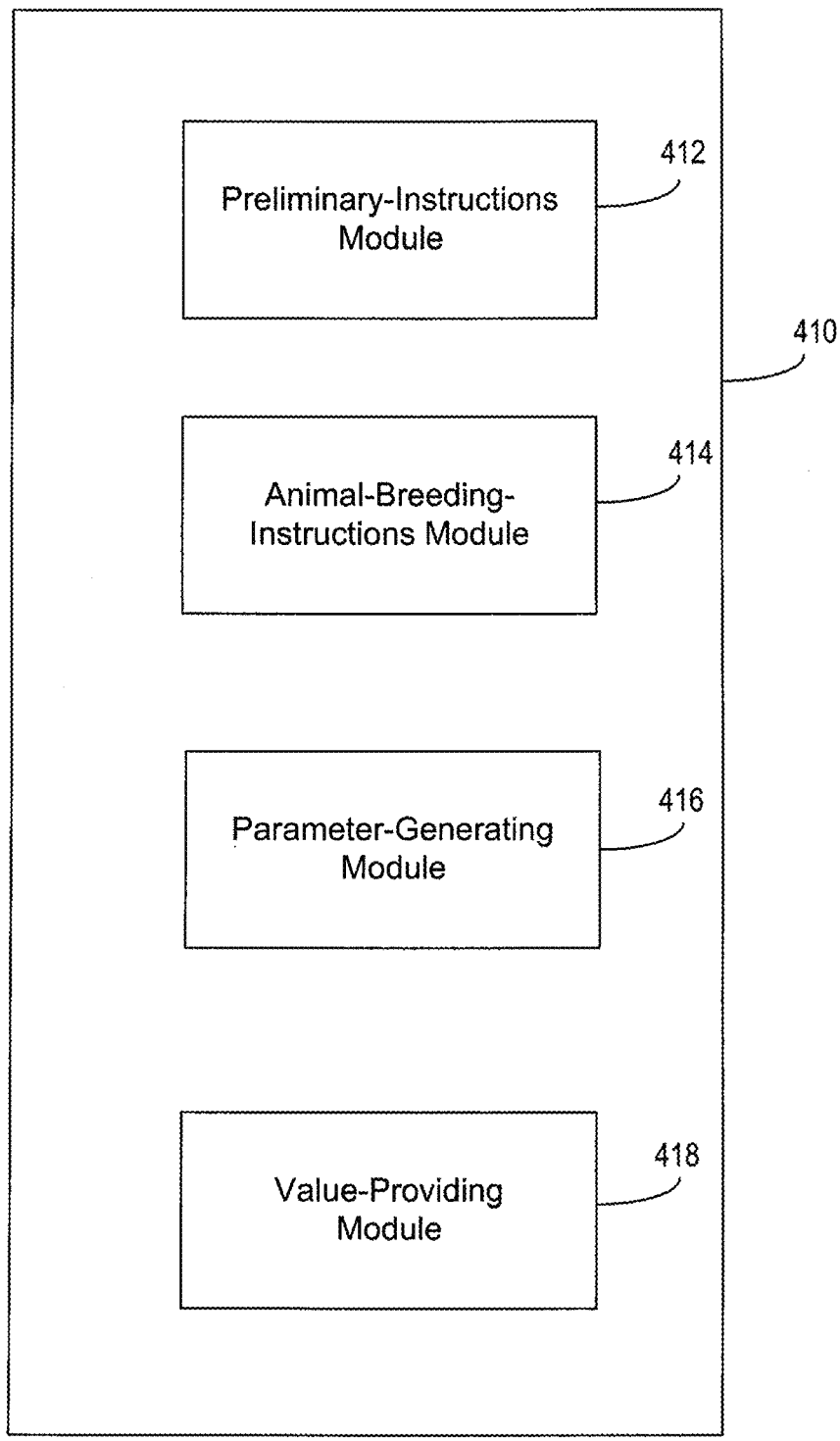
FIG. 17 illustrates an apparatus that is configured to breed virtual animals in accordance with an example embodiment.

For example, FIG. 17 shows an apparatus 410 with computer-implemented modules that are configured to perform operations corresponding to the method 310 shown in FIG. 4 for breeding virtual animals in an online game. An optional preliminary-instructions module 412 is configured to receive instructions to satisfy preliminary conditions for the animal breeding that may or may not be required depending on the game rules. An animal-breeding-instructions module 414 is configured to receive instructions for initiating an animal breeding in the online game. As discussed above, these instructions typically include selecting a male animal and a female animal of a virtual animal type, where each of the selected animals is visually characterized by a corresponding parameter set that includes one or more color parameters. A parameter-generating module 416 is configured to generate from the male-animal parameter set and the female-animal parameter set an offspring-animal parameter set that visually characterizes an offspring animal of the virtual animal type. A value-providing module 418 is configured to provide values from the offspring-animal parameter set to a user machine corresponding to a player in the online game.

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, American Standard Code for Information Interchange (ASCII)). In some contexts, the computer-readable medium may be alternatively described as a computer-useable medium, a computer-storage medium, a computer-program medium, machine-readable medium or some alternative non-transitory storage medium. Depending on the operational setting, specified values for the above-described methods may correspond to input files for the computer program or computer.

Data Flow

Figure 18:
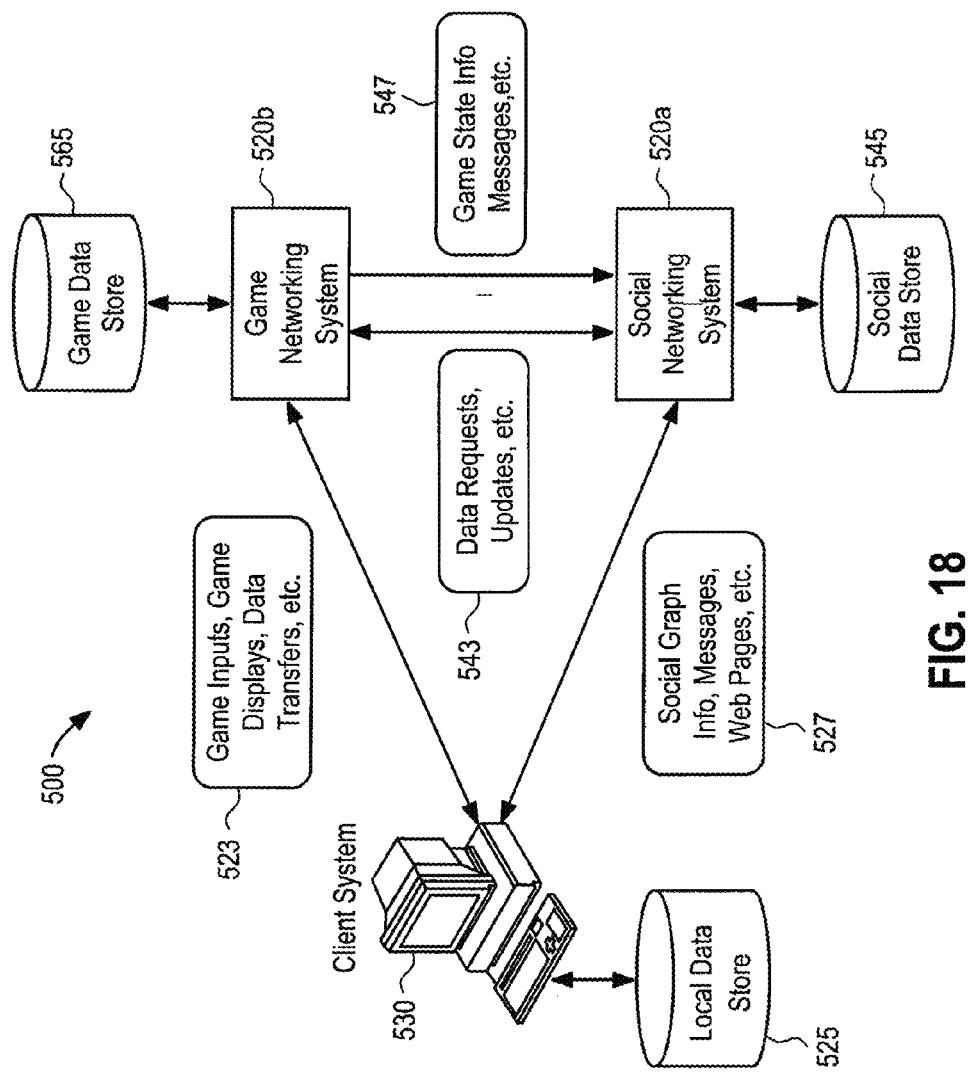
FIG. 18 illustrates an example data flow in a system.

FIG. 18 illustrates an example data flow between the components of system 500. In particular embodiments, system 500 can include client system 530, social networking system 520a, and game networking system 520b. The components of system 500 can be connected to each other in any suitable configuration and using any suitable type of connection. The components may be connected directly or over any suitable network. Client system 530, social networking system 520a, and game networking system 520b can each have one or more corresponding data stores such as local data store 525, social data store 545, and game data store 565, respectively. Social networking system 520a and game networking system 520b can also have one or more servers that can communicate with client system 530 over an appropriate network. Social networking system 520a and game networking system 520b can have, for example, one or more Internet servers for communicating with client system 530 via the Internet. Similarly, social networking system 520a and game networking system 520b can have one or more mobile servers for communicating with client system 530 via a mobile network (e.g., Global System for Mobile Communications (GSM), Personal Communications Service (PCS), Wireless Personal Area Network (WPAN), Wi-Fi, etc.). In some embodiments, one server may be able to communicate with client system 530 over both the Internet and a mobile network. In other embodiments, separate servers can be used.

Client system 530 can receive and transmit data 523 to and from game networking system 520b. This data can include, for example, webpages, messages, game inputs, game displays, HTTP packets, data requests, transaction information, updates, and other suitable data. At some other time, or at the same time, game networking system 520b can communicate data 543, 547 (e.g., game state information, game system account information, page info, messages, data requests, updates, etc.) with other networking systems, such as social networking system 520a (e.g., FACEBOOK, MYSPACE, etc.). Client system 530 can also receive and transmit data 527 to and from social networking system 520a. This data can include, for example, webpages, messages, social graph information, social network displays, HTTP packets, data requests, transaction information, updates, and other suitable data.

Communication between client system 530, social networking system 520a, and game networking system 520b can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP. Other communications protocols, such as HTTP Secure (HTTP-S), File Transfer Protocol (FTP), Simple Network Management Protocol (SNMP), Telnet, and a number of other protocols, may also be used. In addition, a server in one interaction context may be a client in another interaction context. In particular embodiments, the information transmitted between hosts may be formatted as HyperText Markup Language (HTML) documents including HTML5 documents. Other structured document languages or formats can be used, such as Extensible Markup Language (XML), and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, a game state is maintained in a database as a serialized, unstructured string of text data as a so-called Binary Large Object (BLOB). When a player accesses an online game on game networking system 520b, the BLOB containing the game state for the instance corresponding to the player can be transmitted to client system 530 for processing by a client-side executable object. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520b. Game networking system 520b may itself operate by retrieving a copy of the BLOB from a database or an intermediate memory cache (memcache) layer. Game networking system 520b can also de-serialize the BLOB to resolve the game state parameters and execute its own game logic based on the events in the batch file of events transmitted by the client to synchronize the game state on the server side. Game networking system 520b may then re-serialize the game state, now modified, into a BLOB and pass this to a memory cache layer for lazy updates to a persistent database.

With a client-server environment in which the online games may run, one server system, such as game networking system 520b, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 520b for further processing. In addition, multiple client systems 530 may transmit other types of application data to game networking system 520b.

In particular embodiments, a computer-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with, or accessed by, social networking system 520a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 520a or game networking system 520b), where an instance of the online game is executed remotely on a client system 530, which then transmits application event data to the hosting system such that the remote game server synchronizes the game state associated with the instance executed by the client system 530.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run the Flash application or game object code from any suitable networking system (such as, for example, social networking system 520a or game networking system 520b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization with the Flash object shown to the player at client system 530, the Flash client may send the events that caused the game state changes to the in-game object to game networking system 520*b*. However, to expedite the processing and hence the speed of the overall gaming experience, the Flash client may collect a batch of some number of events or updates into a batch file. The number of events or updates may be determined by the Flash client dynamically or determined by game networking system 520*b* based on server loads or other factors. For example, client system 530 may send a batch file to game networking system 520*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file, and the name-value pairs may be in string format.

In particular embodiments, when a player plays an online game on client system 530, game networking system 520*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game that the player is in. When a player resumes playing the game next time, game networking system 520*b* may retrieve the corresponding BLOB from the database to determine the most-recent values of the game-related data. In particular embodiments, while a player is playing the online game, game networking system 520*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Particular embodiments may operate in a WAN environment, such as the Internet, including multiple network addressable systems. FIG. 19 illustrates an example network environment 600 in which various example embodiments may operate. Network cloud 660 generally represents one or more interconnected networks, over which the systems and hosts described herein can communicate. Network cloud 660 may include packet-based WANs (such as the Internet), private networks, wireless networks, satellite networks, cellular networks, paging networks, and the like. As FIG. 19 illustrates, particular embodiments may operate in a network environment comprising one or more networking systems, such as social networking system 620*a*, game networking system 620*b*, and one or more client systems 630. The components of social networking system 620*a* and game networking system 620*b* operate analogously; as such, hereinafter they may be referred to simply as networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to network cloud 660 via, by way of example, a set of routers and/or networking switches 626. In an example embodiment, the functionality hosted by the one or more physical servers 622 may include web or HTTP servers, FTP servers, as well as, without limitation, webpages and applications implemented using Common Gateway Interface (CGI) script, PHP Hypertext Preprocessor (PHP), Active Server Pages (ASP), HTML, XML, Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, Standard Generalized Markup Language (SGML), HTML), images (e.g., Joint Photographic Experts Group (JPEG), Tagged Image File Format (TIFF), and Graphics Interchange Format (GIF)), graphics (vector-based or bitmap), audio, video (e.g., Moving Picture Experts Group (MPEG)), or other multimedia, and combinations thereof. Content object data may also include executable code objects (e.g., games executable within a browser window or frame), podcasts, and so forth. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser, to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment described above and illustrated in FIG. 19 is described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 20:
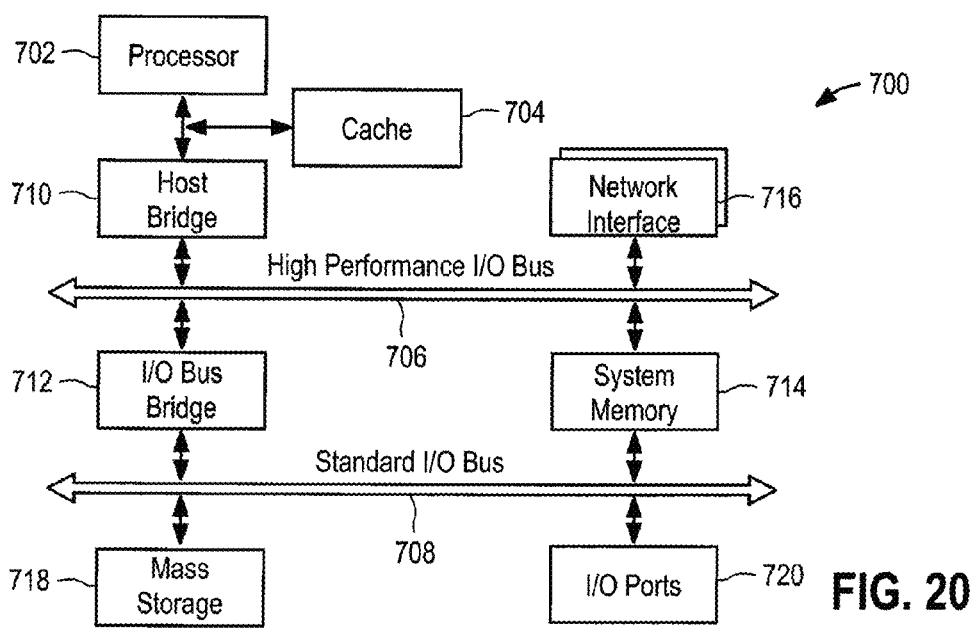
FIG. 20 illustrates an example computer system architecture.

FIG. 20 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, and directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, and so forth. Mass storage 718 provides permanent storage for the data and programming instructions to perform the above-described functions implemented in servers 622, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures, and various components of hardware system 700 may be rearranged. For example, cache memory 704 may be on-chip with processor 702. Alternatively, cache memory 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, Berkeley Software Distribution (BSD) operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tapes, disks, integrated circuits, and servers. The instructions are operational when executed by the processing system to direct the processing system to operate in accordance with the disclosure. The term "processing system" refers to a single processing device or a group of inter-operational processing devices. Some examples of processing devices are integrated circuits and logic circuitry. Those skilled in the art are familiar with instructions, computers, and storage media.

CONCLUSION

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory. Unless specifically indicated to the contrary, ordinal identifiers such as "first" and "second" are used herein for labeling purposes only and are not intended to denote any specific spatial or temporal ordering. Furthermore, the labeling of a "first" element does not imply the presence of a "second" element.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized Application Programming Interface (API) on a device, such as a mobile device (e.g., cellular phone, smart phone, personal Global Positioning System (GPS), PDA, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method of breeding virtual animals in an online game that is accessed through a website of game networking system that supports the online game, the method comprising:
    receiving instructions for initiating an animal breeding in the online game, the instructions being received through a game interface of a user machine corresponding to a player in the online game, the game interface being enabled by communications with the website of the game networking system that supports the online game, the instructions including a selection of a male animal and a female animal of a virtual animal type, and each of the selected animals being visually characterized by a corresponding parameter set that includes one or more color parameters;
    generating, with at least one computer, a plurality of potential-offspring-animal parameter sets from the male-animal parameter set and the female-animal parameter set, the potential-offspring-animal parameter sets visually characterizing a corresponding plurality of potential offspring animals of the virtual animal type;
    selecting from the potential-offspring-animal parameter sets an offspring-animal parameter set that visually characterizes an offspring animal of the virtual animal type;
    changing at least one parameter in the offspring-animal parameter set based on a comparison of the at least one parameter with a parameter record that includes a predetermined number of parameters corresponding to previously generated offspring-animal parameter sets, the at least one parameter being changed in response to a threshold test for a number of occurrences of the at least one parameter within the parameter record, and the parameter record being stored in a computer-readable medium in the at least one computer;
    providing values from the offspring-animal parameter set to the user machine corresponding to the player in the online game after changing the at least one parameter in the offspring-animal parameter set; and
    providing a source artwork for the offspring animal to the user machine to enable generating a display of the offspring animal at the game interface of the user machine by substituting combinations of color-channel values corresponding to the offspring-animal parameter set for color-channel values in the source artwork.

2. The method of claim 1, further comprising:
    providing values from the potential-offspring-animal parameter sets to the user machine;
    receiving from the user machine an identifier of an offspring animal selected from the plurality of potential offspring animals; and
    using the potential-offspring-animal parameter set that corresponds to the identifier as the selected offspring-animal parameter set.

3. The method of claim 1, wherein each parameter set corresponding to the virtual animal type includes a gender parameter to specify male or female, at least one base color parameter to specify a base color, and at least one pattern color parameter to specify a presence or an absence of animal markings with an associated pattern color.

4. The method of claim 1, further comprising:
before receiving the instructions for initiating the animal breeding, receiving instructions to satisfy preliminary conditions for the animal breeding, the preliminary conditions including a specification of a shelter in the online game for the offspring animal.

5. The method of claim 1, wherein the instructions for initiating the animal breeding include an enhancement value for the animal breeding, and the method further comprises:
using the enhancement value to increase a likelihood of success for generating the offspring-animal parameter set.

6. The method of claim 1, wherein generating one of the potential-offspring-animal parameter sets includes generating a random number to select values from the male-animal parameter set or the female-animal parameter set.

7. The method of claim 1, wherein generating one of the potential-offspring-animal parameter sets includes:
generating a first random number to select color parameters for the one offspring parameter set from one of the male-animal parameter set or the female-animal parameter set; and
generating a second random number to determine a random variation about the selected color parameters.

8. The method of claim 1, further comprising:
receiving instructions to satisfy a nourishment requirement for the offspring animal; and
in response to the satisfied nourishment requirement, changing a status of the offspring animal from an offspring status to an adult status so that the offspring-animal parameter set corresponds to one of a second male-animal parameter set that visually characterizes a second male animal of the virtual animal type or a second female-animal parameter set that visually characterizes a second female animal of the virtual animal type.

9. The method of claim 1, further comprising:
providing at least one source artwork for the potential-offspring animals to the user machine to enable generating a display of the potential-offspring animals by substituting combinations of color-channel values corresponding to the potential-offspring-animal parameter sets for color-channel values in the at least one source artwork.

10. The method of claim 1, further comprising:
providing an adult-animal parameter set corresponding to one of the male-animal parameter set or the female-animal parameter set to the user machine; and
providing a source artwork for an adult animal corresponding to the adult-animal parameter set to the user machine to enable generating a display of the adult animal by substituting combinations of color-channel values corresponding to the adult-animal parameter set for color-channel values in the source artwork.

11. The method of claim 1, wherein the color-channel values corresponding to the source artwork identify a base-color field for a base color in the source artwork and a pattern-color field for a pattern color in the source artwork, a first combination of the color-channel values corresponding to the offspring-animal parameter set being mapped to the base-color field in the source artwork and a second combination of the color-channel values corresponding to the offspring-animal parameter set being mapped to the pattern-color field in the source artwork.

12. The method of claim 1, wherein the color-channel values corresponding to the offspring-animal parameter set include three color-parameter values for a base color and three color-parameter values for a pattern color.

13. The method of claim 1, wherein the at least one parameter is changed to avoid a repetition corresponding to a parameter sequence included in the parameter record.

14. The method of claim 1, wherein the at least one parameter is changed to avoid a specified outcome based on the parameter record.

15. The method of claim 1, wherein the parameter record includes a sequential arrangement of the parameters corresponding to the previously generated offspring-animal parameter sets.

16. A non-transitory computer-readable medium that stores a computer program for breeding virtual animals in an online game that is accessed through a website of game networking system that supports the online game, the computer program including computer-program instructions that, when executed by at least one computer, cause the at least one computer to perform operations comprising:
receiving instructions for initiating an animal breeding in the online game, the instructions being received through a game interface of a user machine corresponding to a player in the online game, the game interface being enabled by communications with the website of the game networking system that supports the online game, the instructions including a selection of a male animal and a female animal of a virtual animal type, and each of the selected animals being visually characterized by a corresponding parameter set that includes one or more color parameters;
generating from the male-animal parameter set and the female-animal parameter set a plurality of potential-offspring-animal parameter sets that visually characterize a corresponding plurality of potential offspring animals of the virtual animal type;
selecting from the potential-offspring-animal parameter sets an offspring-animal parameter set that visually characterizes an offspring animal of the virtual animal type;
changing at least one parameter in the offspring-animal parameter set based on a comparison of the at least one parameter with a parameter record that includes a predetermined number of parameters corresponding to previously generated offspring-animal parameter sets, the at least one parameter being changed in response to a threshold test for a number of occurrences of the at least one parameter within the parameter record, and the parameter record being stored in a computer-readable medium in the at least one computer;
providing values from the offspring-animal parameter set to the user machine corresponding to the player in the online game after changing the at least one parameter in the offspring-animal parameter set; and
providing a source artwork for the offspring animal to the user machine to enable generating a display of the offspring animal at the game interface of the user machine by substituting combinations of color-channel values corresponding to the offspring-animal parameter set for color-channel values in the source artwork.

17. The computer-readable medium of claim 16, wherein the computer program further includes computer-program instructions that, when executed by the at least one computer, cause the at least one computer to perform operations comprising:
providing values from the potential-offspring-animal parameter sets to the user machine;
receiving from the user machine an identifier of an offspring animal selected from the plurality of potential offspring animals; and using the potential-offspring-animal parameter set that corresponds to the identifier as the selected offspring-animal parameter set.

18. The computer-readable medium of claim 16, wherein each parameter set corresponding to the virtual animal type includes a gender parameter to specify male or female, at least one base color parameter to specify a base color, and at least one pattern color parameter to specify a presence or an absence of animal markings with an associated pattern color.

19. The computer-readable medium of claim 16, wherein the computer program further includes computer-program instructions that, when executed by the at least one computer, cause the at least one computer to perform operations comprising:
    before receiving the instructions for initiating the animal breeding, receiving instructions to satisfy preliminary conditions for the animal breeding, the preliminary conditions including a specification of a shelter in the online game for the offspring animal.

20. The computer-readable medium of claim 16, wherein the instructions for initiating the animal breeding include an enhancement value for the animal breeding, and the computer program further includes computer-program instructions that, when executed by the at least one computer, cause the at least one computer to perform operations comprising:
    using the enhancement value to increase a likelihood of success for generating the offspring-animal parameter set.

21. The computer-readable medium of claim 16, wherein generating one of the potential-offspring-animal parameter sets includes generating a random number to select values from the male-animal parameter set or the female-animal parameter set.

22. The computer-readable medium of claim 16, wherein generating one of the potential-offspring-animal parameter sets includes:
    generating a first random number to select color parameters for the one offspring parameter set from one of the male-animal parameter set or the female-animal parameter set; and
    generating a second random number to determine a random variation about the selected color parameters.

23. The computer-readable medium of claim 16, wherein the computer program further includes computer-program instructions that, when executed by the at least one computer, cause the at least one computer to perform operations comprising:
    receiving instructions to satisfy a nourishment requirement for the offspring animal; and
    in response to the satisfied nourishment requirement, changing a status of the offspring animal from an offspring status to an adult status so that the offspring-animal parameter set corresponds to one of a second male-animal parameter set that visually characterizes a second male animal of the virtual animal type or a second female-animal parameter set that visually characterizes a second female animal of the virtual animal type.

24. The computer-readable medium of claim 16, wherein the computer program further includes computer-program instructions that, when executed by the at least one computer, cause the at least one computer to perform operations comprising:
    providing at least one source artwork for the potential-offspring animals to the user machine to enable generating a display of the potential-offspring animals by substituting combinations of color-channel values corresponding to the potential-offspring-animal parameter sets for color-channel values in the at least one source artwork.

25. The computer-readable medium of claim 16, wherein the computer program further includes computer-program instructions that, when executed by the at least one computer, cause the at least one computer to perform operations comprising:
    providing an adult-animal parameter set corresponding to one of the male-animal parameter set or the female-animal parameter set to the user machine; and
    providing a source artwork for an adult animal corresponding to the adult-animal parameter set to the user machine to enable generating a display of the adult animal by substituting combinations of color-channel values corresponding to the adult-animal parameter set for color-channel values in the source artwork.

26. An apparatus to breed virtual animals in an online game that is accessed through a website of game networking system that supports the online game, the apparatus comprising at least one computer configured to perform operations for computer-executable modules including:
    an animal-breeding-instructions module configured to receive instructions for initiating an animal breeding in the online game, the instructions being received through a game interface of a user machine corresponding to a player in the online game, the game interface being enabled by communications with the website of the game networking system that supports the online game, the instructions including a selection of a male animal and a female animal of a virtual animal type, and each of the selected animals being visually characterized by a corresponding parameter set that includes one or more color parameters;
    a parameter-generating module configured to generate from the male-animal parameter set and the female-animal parameter set a plurality of potential-offspring-animal parameter sets that visually characterize a corresponding plurality of potential offspring animals of the virtual animal type;
    an offspring-selection module configured to select from the potential-offspring-animal parameter sets an offspring-animal parameter set that visually characterizes an offspring animal of the virtual animal type, and further configured to change at least one parameter in the offspring-animal parameter set based on a comparison of the at least one parameter with a parameter record that includes a predetermined number of parameters corresponding to previously generated offspring-animal parameter sets, the at least one parameter being changed in response to a threshold test for a number of occurrences of the at least one parameter within the parameter record, and the parameter record being stored in a computer-readable medium in the at least one computer; and
    a value-providing module configured to provide values from the offspring-animal parameter set to the user machine corresponding to the player in the online game, and further configured to provide a source artwork for the offspring animal to the user machine to enable generating a display of the offspring animal at the game interface of the user machine by substituting combinations of color-channel values corresponding to the offspring-animal parameter set for color-channel values in the source artwork.

* * * * *

UNITED STATES PATENT AND TRADEMARK OFFICE
CERTIFICATE OF CORRECTION

| | | |
|---|---|---|
| PATENT NO. | : 9,186,582 B2 | Page 1 of 1 |
| APPLICATION NO. | : 13/244922 | |
| DATED | : November 17, 2015 | |
| INVENTOR(S) | : Janis et al. | |

It is certified that error appears in the above-identified patent and that said Letters Patent is hereby corrected as shown below:

In the specification

In column 3, line 31, delete "120" and insert --120a--, therefore

Signed and Sealed this
Twenty-ninth Day of March, 2016

Michelle K. Lee
*Director of the United States Patent and Trademark Office*